US006631423B1

(12) United States Patent
Brown et al.

(10) Patent No.: US 6,631,423 B1
(45) Date of Patent: Oct. 7, 2003

(54) SYSTEM AND METHOD FOR ASSESSING PERFORMANCE OPTIMIZATIONS IN A GRAPHICS SYSTEM

(75) Inventors: John M. Brown, Fort Collins, CO (US); Don W. Dyer, Fort Collins, CO (US); Gautam Mehrotra, Fort Collins, CO (US); Carol L. Lang, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/052,922

(22) Filed: Mar. 31, 1998

(51) Int. Cl.[7] ................................................. G06F 9/00
(52) U.S. Cl. ........................ 709/323; 709/321; 345/522; 717/151
(58) Field of Search ........................... 345/522, 501; 709/321–327; 717/136–161

(56) References Cited

U.S. PATENT DOCUMENTS

| 5,097,411 | A | * | 3/1992 | Doyle et al. ................. 345/501 |
| 5,315,696 | A | * | 5/1994 | Case et al. .................. 345/522 |
| 5,315,698 | A | * | 5/1994 | Case et al. .................. 345/522 |
| 5,491,813 | A | * | 2/1996 | Bondy et al. ................ 345/520 |
| 5,600,768 | A | | 2/1997 | Andresen .................... 395/135 |
| 5,701,483 | A | * | 12/1997 | Pun ............................ 709/321 |
| 5,715,459 | A | * | 2/1998 | Celi et al. ................... 709/323 |
| 5,772,297 | A | * | 6/1998 | Loo et al. ................... 345/419 |
| 5,781,797 | A | * | 7/1998 | Crick et al. ................. 710/10 |
| 5,793,386 | A | * | 8/1998 | Larson et al. ............... 345/501 |
| 5,818,469 | A | * | 10/1998 | Lawless et al. ............. 345/505 |
| 5,821,950 | A | * | 10/1998 | Rentschler et al. ......... 345/503 |
| 5,856,829 | A | | 1/1999 | Gray, III et al. ............. 345/422 |
| 5,861,893 | A | * | 1/1999 | Sturgess ..................... 345/522 |
| 5,883,642 | A | | 3/1999 | Thomas et al. .............. 345/515 |
| 5,896,139 | A | * | 4/1999 | Strauss ........................ 345/440 |
| 5,936,641 | A | * | 8/1999 | Jain et al. .................... 345/501 |
| 5,982,399 | A | * | 11/1999 | Scully et al. ................ 430/434 |
| 5,990,911 | A | * | 11/1999 | Arrott et al. ................ 345/418 |
| 6,046,747 | A | * | 4/2000 | Saunders et al. ........... 345/522 |
| 6,047,123 | A | * | 4/2000 | Brown et al. ................ 717/127 |
| 6,057,847 | A | | 5/2000 | Jenkins ........................ 345/422 |
| 6,084,584 | A | * | 7/2000 | Nahi et al. ................... 345/156 |
| 6,088,701 | A | * | 7/2000 | Whaley et al. .............. 345/418 |
| 6,184,908 | B1 | * | 2/2001 | Chan et al. .................. 345/522 |
| 6,229,553 | B1 | | 5/2001 | Duluk, Jr. et al. .......... 345/506 |
| 6,232,981 | B1 | | 5/2001 | Gossett ....................... 345/430 |
| 6,279,099 | B1 | * | 8/2001 | Van Hook et al. .......... 345/503 |
| 6,337,689 | B1 | * | 1/2002 | Hochmuth et al. ......... 345/419 |
| 6,348,919 | B1 | * | 2/2002 | Murphy ...................... 345/421 |
| 6,362,825 | B1 | * | 3/2002 | Johnson ...................... 345/522 |
| 6,421,738 | B1 | * | 7/2002 | Ratan et al. ................. 709/328 |
| 6,469,704 | B1 | * | 10/2002 | Johnson ...................... 345/553 |

* cited by examiner

Primary Examiner—St. John Courtenay, III
Assistant Examiner—Lewis A. Bullock, Jr.

(57) ABSTRACT

A system for identification and assessment of performance optimizations implemented in the graphics environment, the identification and assessment of the performance optimizations based upon an optimized graphics call sequence generated by an application of one or more optimizations applied to a captured graphics call sequence occurring between said first and second drivers. The resulting optimized graphics call sequence causes the same graphics rendering to occur when provided to the graphics system as the original graphics call sequence. As such, the graphics application and associated graphics interface driver may then be analyzed by the application developer to identify specific modifications which, when implemented, would generate such an optimized graphics call sequence. This may include implementing specific modifications to the graphics application as well as implementing portions or all of the present invention into the driver for real-time execution.

67 Claims, 27 Drawing Sheets

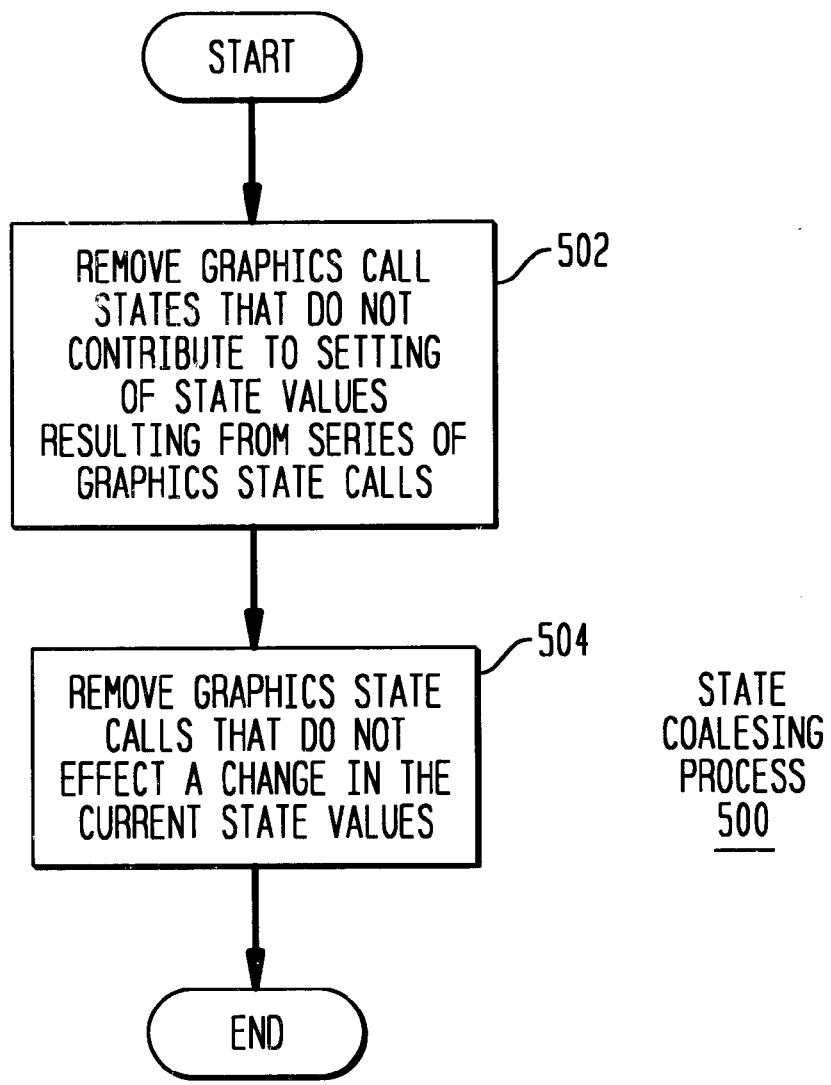

FIG. 5C

| EXEMPLARY COALESCING OF A GRAPHICS CALL SEQUENCE ||
|---|---|
| ORIGINAL GRAPHICS CALL SEQUENCE | OPTIMIZED GRAPHICS CALL SEQUENCE |
| glShadeModel(GL_SMOOTH)<br>glEnable(GL_LIGHT0)<br>glEnable(GL_LIGHT1)<br>glEnable(GL_DEPTH_TEST)<br>glEnable(GL_LIGHT0)<br>glDisable(GL_LIGHT1)<br>glDisable(GL_DEPTH_TEST)<br>glShadeModel(GL_FLAT) | glShadeModel(GL_FLAT)<br>glEnable(GL_LIGHT0) |

FIG. 6C

EXEMPLARY COALESCING OF A GRAPHICS PRIMITIVE CALL SEQUENCE INTO A SERIES OF DISCRETE PRIMITIVES

| ORIGINAL GRAPHICS PRIMITIVE SEQUENCE (650) | OPTIMIZED GRAPHICS PRIMITIVE SEQUENCE (654) |
|---|---|
| /*triangle 1*/ (652A)<br>glBegin(GL_TRIANGLES) (652B)<br>glVertex( . . .) (652C)<br>glVertex( . . .) (652D)<br>glVertex( . . .) (652E)<br>glEnd()<br>/*triangle 2*/<br>glBegin (GL_TRIANGLES) (652F)<br>glVertex( . . .) (652G)<br>glVertex( . . .) (652H)<br>glVertex( . . .) (652I)<br>glEnd() (652J) | glBegin(GL_TRIANGLES) (656A)<br>/*triangle 1*/<br>glVertex( . . .) (656B)<br>glVertex( . . .) (656C)<br>glVertex( . . .) (656D)<br>/*triangle 2*/<br>glVertex( . . .) (656E)<br>glVertex( . . .) (656F)<br>glVertex( . . .) (656G)<br>glEnd() (656H) |

EXEMPLARY COALESCING OF A GRAPHICS PRIMITIVE SEQUENCE INTO A STRIP PRIMITIVE

| ORIGINAL GRAPHICS PRIMITIVE SEQUENCE (650) | OPTIMIZED GRAPHICS PRIMITIVE SEQUENCE (664) |
|---|---|
| /*triangle 1*/ (652A)<br>glBegin(GL_TRIANGLES) (652B)<br>glVertex( . . .) (652C)<br>glVertex( . . .) (652D)<br>glVertex( . . .) (652E)<br>glEnd()<br>/*triangle 2*/<br>glBegin (GL_TRIANGLES) (652F)<br>glVertex( . . .) (652G)<br>glVertex( . . .) (652H)<br>glVertex( . . .) (652I)<br>glEnd() (652J) | glBegin(GL_TRIANGLES_STRIP) (666A)<br>/*triangle 1*/<br>glVertex( . . .) (666B)<br>glVertex( . . .) (666C)<br>glVertex( . . .) (666D)<br>/*triangle 2*/<br>glVertex( . . .) (666E)<br>glEnd() (666F) |

FIG. 8C

| | EXEMPLARY COMPILATION OF COMMON STATE PRIMITIVE COMMAND SETS | |
|---|---|---|
| | ORIGINAL GRAPHICS PRIMITIVE SEQUENCE (850) | OPTIMIZED GRAPHICS PRIMITIVE SEQUENCE (854) |
| 860A {852A–852F} | glEnable(GL_LIGHTING)<br>glBegin(GL_TRIANGLES)<br>glVertex( . . .)<br>glVertex( . . .)<br>glVertex( . . .)<br>glEnd() | 858A: glEnable(GL_LIGHTING)<br>glBegin(GL_TRIANGLES)<br>glVertex( . . .)<br>glVertex( . . .)  } 856A<br>glVertex( . . .)<br>glEnd()<br>glBegin(GL_TRIANGLES)<br>glVertex( . . .)<br>glVertex( . . .)  } 856B<br>glVertex( . . .)<br>glEnd() |
| 860B {852G–852K} | glDisable(GL_LIGHTING)<br>glBegin(GL_LINES)<br>glVertex( . . .)<br>glVertex( . . .)<br>glEnd() | |
| 860C {852L–852Q} | glEnable(GL_LIGHTING)<br>glBegin(GL_TRIANGLES)<br>glVertex( . . .)<br>glVertex( . . .)<br>glVertex( . . .)<br>glEnd() | 858B: glDisable(GL_LIGHTING)<br>glBegin(GL_LINES)<br>glVertex( . . .)  } 856C<br>glVertex( . . .)<br>glEnd()<br>glBegin(GL_LINES)<br>glVertex( . . .)  } 856D<br>glVertex( . . .)<br>glEnd() |
| 860D {852R–852V} | glDisable(GL_LIGHTING)<br>glBegin(GL_LINES)<br>glVertex( . . .)<br>glVertex( . . .)<br>glEnd() | |

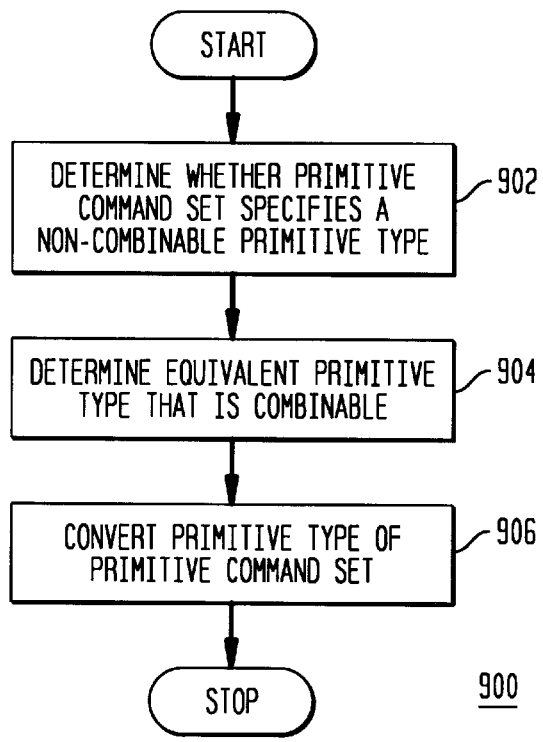

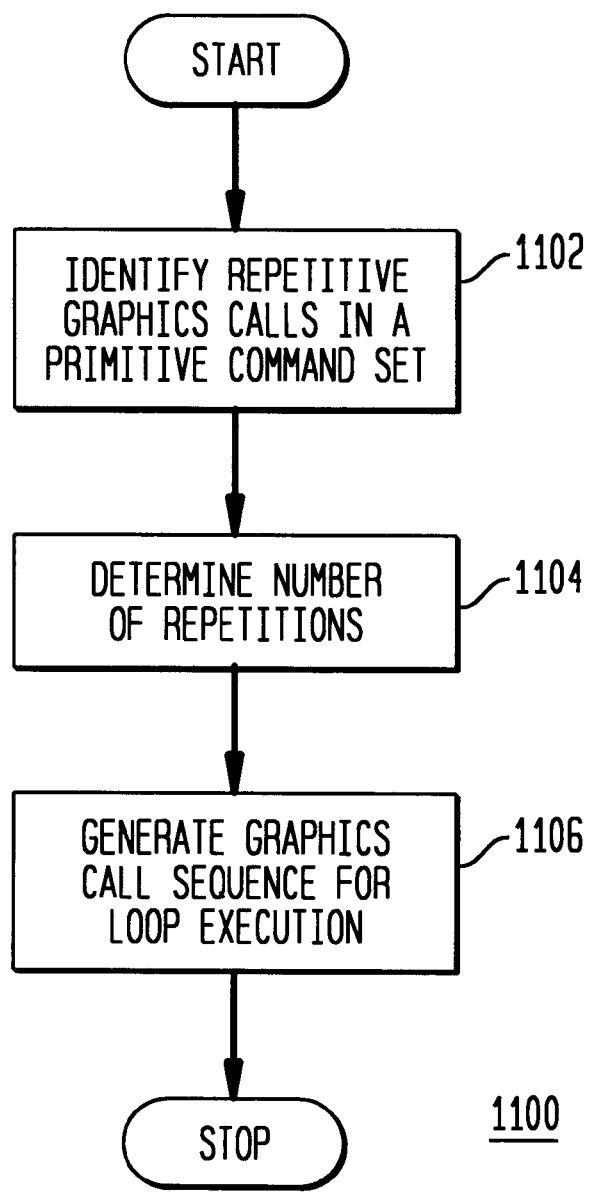

FIG. 11B

| EXEMPLARY LOOP GENERATION PROCESS ||
|---|---|
| ORIGINAL GRAPHICS PRIMITIVE SEQUENCE | OPTIMIZED GRAPHICS PRIMITIVE SEQUENCE |
| glBegin(GL_TRIANGLES)<br>glNormal( . . .)<br>glVertex( . . .)<br>glNormal( . . .)<br>glVertex( . . .)<br>glNormal( . . .)<br>glVertex( . . .)<br>glEnd() | glBegin(GL_TRIANGLES)<br>for (i=0;i<3;i++)<br>{<br>    glNormal( . . .)<br>    glVertex( . . .)<br>}<br>glEnd() |

SYSTEM AND METHOD FOR ASSESSING PERFORMANCE OPTIMIZATIONS IN A GRAPHICS SYSTEM

BACKGROUND OF THE INVENTION

1. Field of the Invention

The present invention relates generally to state machine performance optimization and, more particularly, to the assessment of performance optimizations in a graphics system environment.

2. Related Art

Computer graphics systems are commonly used for displaying two- and three-dimensional graphics representations of objects on a two-dimensional video display screen. Current computer graphics systems provide highly detailed representations and are used in a variety of applications.

In a typical computer graphics system an object or model to be represented on the display screen is broken down into graphics primitives. Primitives are basic components of a graphics display and may include, for example, points, lines, triangles, quadrilaterals, triangle strips and polygons. Typically, a hardware/software scheme is implemented to render, or draw, the graphics primitives that represent a view of one or more objects being represented on the display screen.

Generally, the primitives of the three-dimensional object to be rendered are defined by a host computer in terms of primitive data. For example, when the primitive is a triangle, the host computer may define the primitive in terms of the X, Y, Z and W coordinates of its vertices, as well as the red, green and blue and alpha (R, G, B and $\alpha$") color values of each vertex. Additional primitive data may be used in specific applications. Rendering hardware interpolates the primitive data to compute the display screen pixels that represent each primitive, and the R, G and B color values for each pixel.

A graphics software interface is typically provided to enable graphics applications located on the host computer to efficiently control the graphics system. The graphics interface provides specific commands that are used by a graphics application to specify objects and operations to produce an interactive, three-dimensional graphics environment. Such a graphics interface is typically implemented with software drivers.

Graphics systems generally behave as a state machine in that a specified state value remains in effect until it is changed by the graphics application through the issuance of a command, referred to herein as a graphics call, to the graphics system through the graphics interface. Thus, all vertices are rendered in accordance with a current value for each state variable in the graphics system.

By providing detailed control over the manner in which primitives and their vertices are rendered in the graphics system, the graphics software interface provides software developers with considerable flexibility in creating graphics application software programs. For example, a graphics software application may be structured in any one of many different configurations to implement a desired function or to achieve a desired result in the computer graphics system.

However, some sequences of graphics calls and the manner in which primitives, vertices and states are implemented are more efficient than others. That is, although multiple graphics applications may achieve the rendering of the same object or model on a display screen, certain graphics applications may cause the graphics system to perform unnecessary operations, or perform certain operations in a manner that requires greater overhead than perhaps is otherwise necessary.

There has been some attempt in the past to assess the performance of the graphics system and the efficiency with which the graphics system is controlled and otherwise utilized by the graphics software application. This includes identifying potential areas that may be improved and the assessment of attempted performance optimizations to the graphics application or graphics system.

Traditional graphics optimization techniques have generally required the prototyping of potential improvements in the graphics applications. Typically, the application developer first identifies areas in which the graphics system is controlled and utilized. Based upon perceived inefficiencies in the graphics system, the graphics application is modified to implement particular functions differently and to achieve a desired effect in the graphics system more efficiently. The modified graphics application is recompiled, debugged and then tested to determine whether the intended performance benefits have been realized.

This process of prototyping potential performance optimizations is time consuming and expensive. As a result, it is not uncommon for potential optimizations to not be fully explored to avoid such time and expense. In addition, the time consuming process may not necessarily yield the anticipated results, increasing the cost of those improvements which are implemented.

Furthermore, since one or more optimizations are implemented at the graphics application level, the factors contributing to changes in system performance may be masked. That is, because the full impact throughout the graphics application and graphics system of each attempted optimization is typically unknown, the contributing factors to any performance increase resulting from the implementation of such optimizations is also unknown. As a result, it is difficult or not possible for the application developer to select those optimizations which are cost effective and should be permanently implemented. In addition, for the same reasons, optimizations yielding minimal performance benefits are often implemented unnecessarily.

What is needed, therefore, is a system and method that allows for the efficient and accurate assessment of performance optimizations in graphics environments without having to prototype potential optimizations in the graphics application.

SUMMARY OF THE INVENTION

The present invention overcomes the above and other drawbacks to conventional performance optimization identification and assessment techniques. The present invention includes both methods and apparatus for evaluating and optimizing a graphics call sequence generated by a graphics application in accordance with a particular graphics application programing interface (API). In one embodiment, the graphics API is the OpenGL® API. The resulting optimized graphics call sequence causes the same graphics rendering to occur when provided to the graphics system as the original graphics call sequence. As such, the graphics application and associated graphics interface driver may then be analyzed by the application developer to identify specific modifications which, when implemented, would generate such an optimized graphics call sequence. This may include implementing specific modifications to the graphics application as well as implementing portions or all of the present invention into the associated driver for real-time execution.

Furthermore, the present invention enables the application developer to easily and non-invasively assess graphics performance optimizations made to the graphics application or associated driver based upon the optimized graphics call sequence. Significantly, the present invention allows for consideration of the changes in graphics system performance which would result from implementation of such performance optimizations. Only the desired performance optimizations may then be implemented, avoiding the inefficient process of prototyping potential performance optimizations without a full appreciation of the resulting changes in graphics system performance which will be caused by the implementation of such optimizations.

A further advantage of the present invention is that it can be used to identify usages of the graphics interface commonly invoked by the graphics application. This information can then be used by a graphics system vendor to optimize the underlying software or hardware in the graphics system to improve the manner in which the graphics system operates in response to such common graphics interface usages.

In one aspect of the invention, a performance optimization assessment system is disclosed. The system includes one or more graphics call sequence optimizers that operate on a captured graphics call sequence. The optimizers include a plurality of different optimizers, one or more of which may operate on all or a portion of the captured graphics call sequence to generate the optimized graphics call sequence. The optimizers may be performed in any desired sequence, utilizing the results of any other optimizer. In this manner the performance benefits of each type of optimizer may be individually evaluated and, if desired, combined with the results of other optimizers. In operation, a graphics call sequence capture mechanism captures a sequence of graphics calls.

In one embodiment, the optimizers includes a graphics state call coalescer. The graphics state call coalescer determines whether a given continuous series of graphics state calls in the captured graphics call sequence contains redundant, conflicting or otherwise unnecessary graphics state calls and, if so, eliminates the unnecessary graphics state calls so as to reduce the total number of graphics state calls in that continuous series. Generation of such an optimized series of graphics state calls by the graphics application would reduce the number of state changes invoked in the graphics system, thereby reducing the overhead associated with the particular continuous series of graphics state calls.

In another embodiment, the optimizers include a graphics primitive coalescer. The graphics primitive coalescer coalesces the graphics vertex calls contained in a continuous series of primitive command sets that render primitives of the same type. The graphics primitive calls that comprise a primitive command set include the glBegin( )/glEnd( ) graphics call pair as well as the intervening graphics vertex calls. Other graphics calls such as graphics attribute calls may exist in the vertex-data list between the glBegin( )/glEnd( ) pair and are not of concern to the graphics primitive coalescer and are simply passed through with their associated graphics vertex calls. When such a continuous series of primitive command sets is identified, the glBegin( )/glEnd( ) pairs are removed, coalescing the graphics vertex calls between a single glBegin( )/glEnd( ) pair with a single vertex-data list comprising all of the graphics vertex calls in the original continuous series of graphics primitive calls.

As noted above, certain primitives may be rendered in a strip form. These include line, triangle and quadrilateral strips. As described above, each discrete primitive in each type of strip shares at least one common vertex with a neighboring discrete primitive of the strip. Rendering such common vertices twice requires unnecessary duplicative operations to be performed by the graphics system. In accordance with one embodiment of the primitive coalescing process of the present invention, the graphics primitive calls may be further coalesced to eliminate the graphics vertex calls rendering redundant vertices if the proper number of common vertices exist between neighboring discrete primitives. Such a modification would necessarily include the altering the type of the glBegin( )/glEnd( ) pair to specify a primitive strip rather discrete primitive. Thus, the primitive coalescing optimizer optimizes the series of graphics primitive calls by eliminating the redundant processing associated with the duplicative glBegin( )/glEnd( ) pairs and duplicative vertices.

In another embodiment, the optimizers include a common state primitive compiler. The common state primitive compiler remedies frequent toggling of state values by the graphics application. Oftentimes, state values will be set to particular values to render a number of primitives, followed by the setting of the same state to other values to render additional primitives. Subsequently, the same state is again changed to the original values to render still additional primitives. Such toggling of state values results in duplicative graphics state calls being implemented by the graphics system. A continuous series of primitive command sets that are to be rendered with the same state values appears in the captured graphics call sequence with one or more graphics state calls preceding them. A compiled list of primitive command sets preceded by the graphics state calls necessary to establish the common state values are output as an optimized graphics call sequence. Generation of such an optimized graphics call sequence will cause all requisite graphics state calls for a series of primitives to be issued once prior to the rendering of that series of primitives. This significantly reduces the toggling of graphics states and the processing overhead associated with such state changes.

In another embodiment, the optimizers include a primitive type converter. The primitive type converter converts the primitive type specified in a primitive command set from a non-combinable primitive type to a combinable primitive type. Non-combinable primitive types are those types of primitives that cannot be coalesced by the graphics primitive coalescer. The specified primitive types which are non-combinable are a function of the implemented graphics interface. However, it is not uncommon for graphics applications to generate a primitive command set that specifies a non-combinable primitive type when the vertices contained within the primitive command set could also be typed as a combinable primitive type, if the appropriate number of graphics vertex calls are specified.

In another embodiment, the optimizers include a vertex array builder. The vertex array builder creates a vertex array having vertices identified in a series of graphics vertex calls of a primitive command set, and generates the associated offset for reference by a graphics array call that uses the array of vertices to render a number of specified primitives. Establishing such an array and providing such graphics calls reduces the number of graphics calls that are sent to the graphics system to render a desired series of graphics primitives. Furthermore, such an approach utilizes available high performance array processing capabilities provided by some implementations the OpenGL API, reducing the processing time that would have been incurred in processing a long series of graphics primitive calls.

In another embodiment, the optimizers include a vertex loop generator. The vertex loop generator is applied to any repetitive series of graphics calls occurring in a primitive command set. The vertex loop generator generates a repeatable loop to efficiently process repetitive series of graphics calls. This optimization is typically implemented after all other previously described optimizations have been implemented. This optimization has the advantage of converting graphics calls occurring in a primitive command set into a form that, because of cache behavior and other factors, yields performance results similar to the graphics application. Modeling cache behavior employed in present day computing systems enhances the value of the performance characteristic analysis made between the original graphics call sequence and the optimized graphics call sequence.

In another aspect of the present invention, an apparatus for optimizing a graphics call sequence generated by a graphics application in accordance with a particular graphics API is disclosed. The apparatus may be implemented either in graphics hardware or a driver comprising the graphics system. Alternatively, the apparatus may be included in a driver associated with the graphics application. This provides the significant advance of benefiting from the above optimizations during real-time operations of the graphics environment.

In another aspect of the invention, a graphics environment is disclosed. The graphics environment includes a graphics application communicating with a graphics system through a first driver interfaced directly with the graphics application and a second driver interfaced directly with the graphics system, the drivers communicating with each other using a predetermined graphics interface. Implemented in the graphics environment is a system for identification and assessment of performance optimizations implemented in the graphics environment, said identification and assessment of said performance optimizations based upon an optimized graphics call sequence generated by an application of one or more optimizations applied to a captured graphics call sequence occurring between said first and second drivers.

Further features and advantages of the present invention as well as the structure and operation of various embodiments of the present invention are described in detail below with reference to the accompanying drawings. In the drawings, like reference numerals indicate like or functionally similar elements or method steps. Additionally, the left-most one or two digits of a reference numeral identifies the drawing in which the reference numeral first appears.

BRIEF DESCRIPTION OF THE DRAWINGS

The foregoing, and other objects and advantages, will be understood more clearly from the following detailed description and from the accompanying figures. This description is given by way of example only and in no way restricts the scope of the invention. In the figures:

FIG. 5A is a high level flowchart of one embodiment of the state coalescing process of the present invention.

FIG. 5C is a table illustrating an exemplary coalescing of a graphics state call sequence.

FIG. 6C is a table illustrating an exemplary coalescing of a graphics primitive call sequence to a series of discrete primitive.

FIG. 6D is a table illustrating an exemplary coalescing of a graphics primitive call sequence to a strip primitive.

FIG. 8C is a table illustrating an exemplary compilation of common state primitive command sets in accordance with one embodiment of the present invention.

FIG. 9A is a high level flowchart of one embodiment of the primitive type conversion process of the present invention.

FIG. 9B is a table illustrating an exemplary primitive type conversion process in accordance with one embodiment of the present invention.

FIG. 11A is a high level flowchart of one embodiment of the vertex loop rolling process of the present invention.

FIG. 11B is a table illustrating an exemplary primitive type vertex loop rolling process in accordance with one embodiment of the present invention.

DETAILED DESCRIPTION

A. Graphics System

Figure 1:
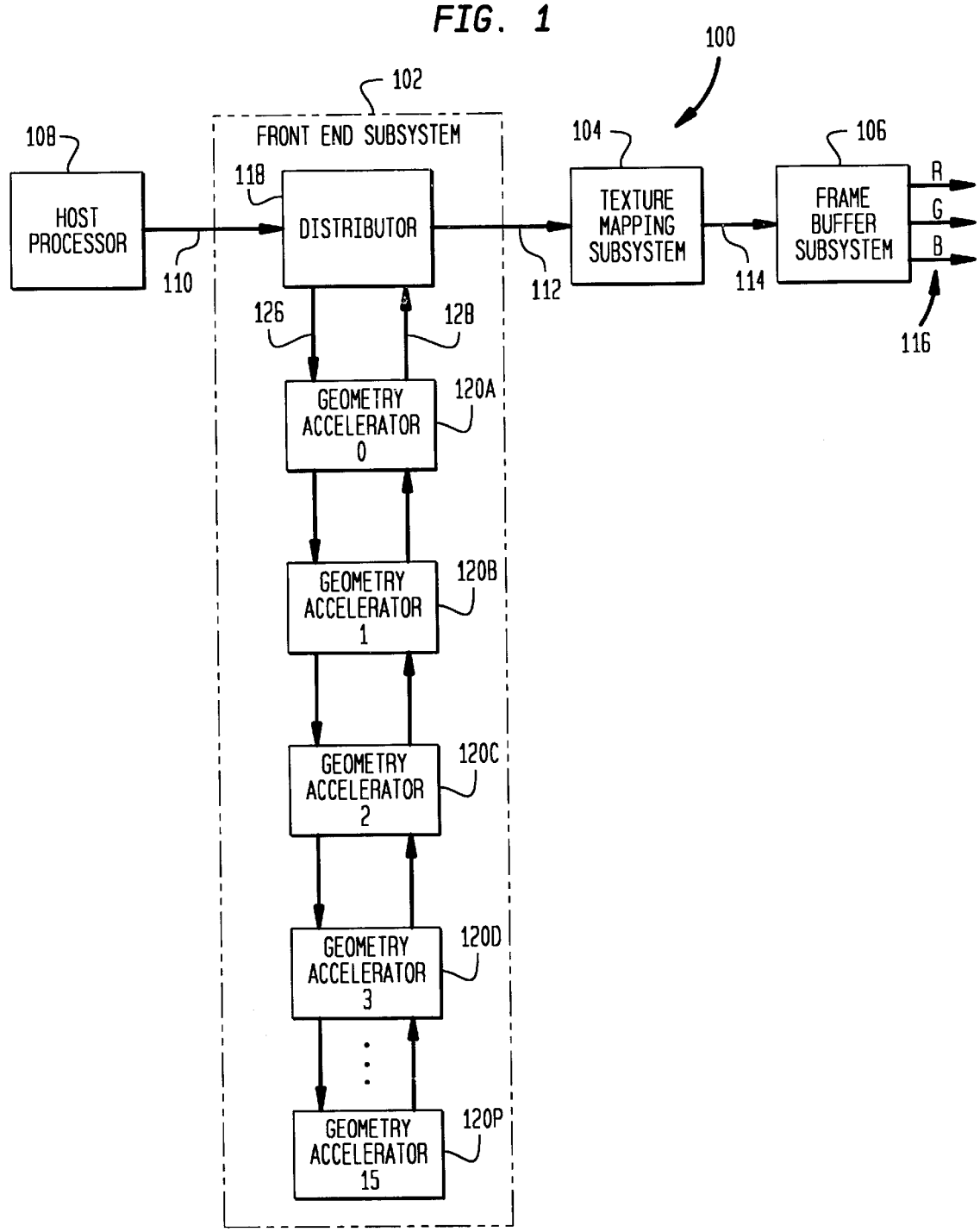
FIG. 1 is a block diagram of an exemplary computer graphics system in which the present invention may be implemented.

FIG. 1 is a block diagram of an exemplary computer graphics system 100 suitable for implementing the performance optimization system and methodology of the present invention. As shown, the system 100 includes a front-end subsystem 102, a texture mapping subsystem 104 and a frame buffer subsystem 106. The front-end subsystem 102 receives primitives to be rendered from the host computer 108 over bus 110. The primitives are typically specified by X, Y, Z and W coordinate data and R, G, B and a color data and texture S, T, R and Q coordinates for portions of the primitives, such as vertices.

Data representing the primitives in three dimensions is provided by the front-end subsystem 102 to the frame buffer subsystem 106 over bus 112 through on optional texture mapping subsystem 104. The texture mapping subsystem 104 interpolates the received primitive data to provide values from stored texture maps to the frame buffer subsystem 106 over one or more buses 114.

The frame buffer subsystem 106 interpolates the primitive data received from the front-end subsystem 102 to compute the pixels on the display screen that will represent each primitive, and to determine object color values and Z values for each pixel. The frame buffer subsystem 106 combines, on a pixel-by-pixel basis, the object color values with the resulting texture data provided from the optional texture mapping subsystem 104, to generate resulting image R, G and B values for each pixel. R, G and B color control signals for each pixel are respectively provided over R, G and B lines 116 to control the pixels of the display screen (not shown) to display a resulting image on the display screen that represents the texture-mapped primitive.

The front-end subsystem 102 includes a distributor 118 and a plurality of three-dimensional geometry accelerators 120A–120P (collectively and generally referred to as geometry accelerators 120). The distributor 118 receives the coordinate and other primitive data over bus 110 from a graphics application on the host computer 108. The distributor 118 dynamically allocates the primitive data among the geometry accelerators 120.

Primitive data, including vertex state (coordinate) and property state (color, lighting, etc.) data, is provided over bus 126 to the geometry accelerators 120. Each geometry accelerator 120 performs well-known geometry accelerator functions which results in rendering data for the frame buffer subsystem 106. Rendering data generated by the geometry accelerators 120 is provided over output bus 128 to distributor 118. Distributor 118 reformats the primitive output data (that is, rendering data) received from the geometry accelerators 120, performs a floating point to fixed point conversion, and provides the primitive data stream over bus 112 to the optional texture-mapping subsystem 104 and, subsequently, to frame buffer subsystem 106.

The texture mapping subsystem 104 and frame buffer subsystem 106 may be any well-known systems now or later developed. Furthermore, the front-end subsystem 102, texture mapping subsystem 104 and frame buffer subsystem 106 are preferably pipelined and operate on multiple primitives simultaneously. While the texture mapping subsystem 104 and the frame buffer subsystem 106 operate on primitives previously provided by the front-end subsystem 102, the front-end subsystem 102 continues to operate and provide new primitives until the pipelines in the subsystems 104 and 106 become full.

B. Primitive Specification and Assembly

A graphics interface is typically provided to enable graphics applications located on the host processor 108 to efficiently control the graphics system 100. A driver software program residing on the host computer 108 communicates with graphics applications on the host processor. A graphics application on the host processor 108 issues graphics calls in accordance with an established method of communication. A driver on the graphics system converts the graphics calls as required to communicate with the graphics hardware 100 and/or may pass the API call through to the graphics hardware 100.

In a preferred embodiment, the OpenGL® standard is utilized to provide an application program interface (API) to graphics system 100. (OpenGL is a registered trademark of Silicon Graphics, Inc.). The OpenGL software interface provides specific commands that are used to specify objects and operations to produce interactive, three-dimensional applications. OpenGL is a streamlined, hardware-independent interface designed to be implemented on many different hardware platforms. As such, in computer systems which support OpenGL, the operating systems and graphics application software programs can make calls to the computer graphics system according to the standardized API without knowledge of the underlying hardware configuration.

The OpenGL standard provides a complete library of low-level graphics manipulation commands for describing models of three-dimensional objects (the "GL" of OpenGL refers to "Graphics Library"). This standard was originally based on the proprietary standards of Silicon Graphics, Inc., but was later transformed into an open standard which is used in high-end graphics-intensive workstations, and, more recently, in high-end personal computers. The OpenGL standard is described in the OPENGL PROGRAMMING GUIDE, version 1.1 (1997), the OPENGL REFERENCE MANUAL, version 1.1 (1997), and a book by Segal and Akeley (of SGI) entitled THE OPENGL GRAPHICS SYSTEM: A SPECIFICATION (Version 1.0), all of which are hereby incorporated by reference in their entirety.

In a preferred embodiment of the present invention, the performance assessment system is configured to operate in a graphics system 100 which provides the OpenGL API software interface. The host driver converts standard calls specified by the OpenGL API to access the graphics system 100 to render three-dimensional images using the graphics system 100 of the present invention. As is well known, with OpenGL, all geometric objects are ultimately described as an ordered set of vertices. The graphics vertex call, glVertex( ), is provided to specify a single vertex for use in describing a geometric object. Up to four coordinates (x, y, z, w) may be supplied for a particular vertex or as few as two (x, y) by selecting the appropriate version of the command.

To create a primitive, such as points, a line, or a polygon, graphics vertex calls specifying the set of vertices creating such primitives must be bracketed between a call to a glBegin( ) command and a call to a glEnd( ) command, commonly referred to as a glBegin( )/glEnd( ) pair. The glBegin( )/glEnd( ) pair and the intervening graphics vertex calls and other appropriate calls is referred to herein as a primitive command set. The argument passed with the glBegin( ) graphics call determines the type of geometric primitive to be constructed from the vertices in the primitive command set. Referring to FIGS. 2A–2J, the currently-available primitive types supported by the exemplary API, OpenGL, are described below.

Figure 2A:
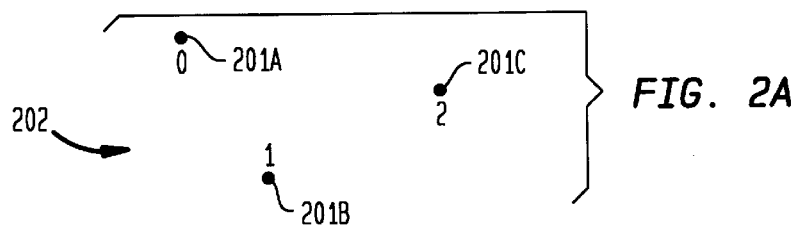
FIG. 2A is a diagram of a series of independent point primitives which may be rendered on a computer display screen.

The command glBegin(GL_POINTS) specifies individual points to be displayed. Specifically, the command causes the graphics system 100 to draw a point at each of the n vertices bracketed by the glBegin( )/glEnd( ) pair. Referring to FIG. 2A, there are three points 201A, 201B and 201C, each of which is drawn at one of the vertices $v_0$, $v_1$ and $v_2$, respectively.

Figure 2B:
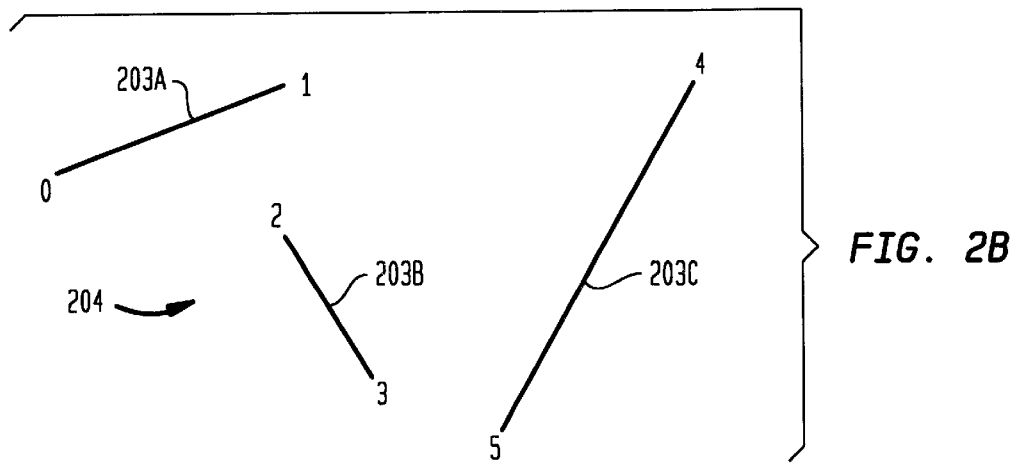
FIG. 2B is a diagram of a series of independent line primitives which may be rendered on a computer display screen.

The command glBegin(GL_LINES) specifies pairs of vertices interpreted as the end point of individual line segments. Specifically, the command causes the graphics system 100 to draw a series of unconnected line segments. Line segments are drawn between $v_0$ and $v_1$, between $v_2$ and $v_3$, and so on. If n is odd, the last segment is drawn between $v_{n-3}$ and $v_{n-2}$ and $v_{n-1}$ is ignored. Referring to FIG. 2B, lines 204 include a line 203A drawn between vertices $v_0$ and $v_1$, line 203B drawn between vertices $v_2$ and $v_3$, and line 203C drawn between vertices $v_4$ and $v_5$. As shown, the lines 203A, 202B and 203C are independent primitives; that is, they do not have a common vertex; they are unconnected line segments.

Figure 2C:
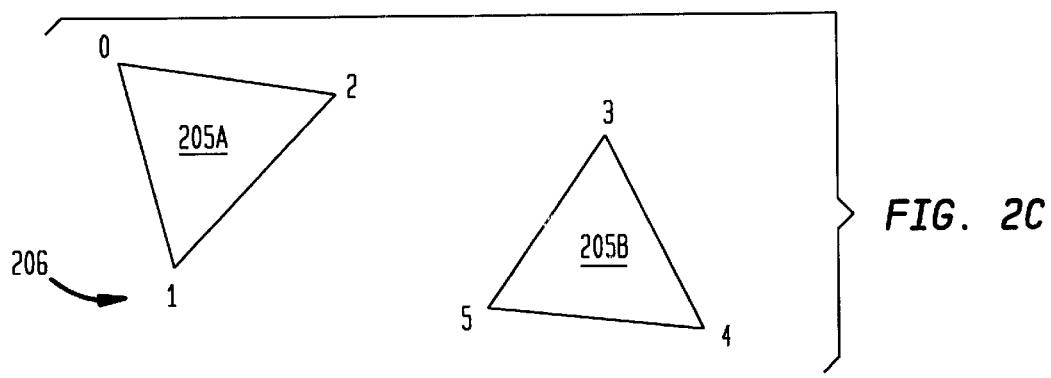
FIG. 2C is a diagram of a series of independent triangle primitives which may be rendered on a computer display screen.

The command glBegin(GL_TRIANGLES) specifies triples of vertices interpreted as the end points of a triangle. Specifically, the command causes the graphics system 100 to draw a series of triangles (three-sided polygons) using vertices $v_0$, $v_1$, $v_2$, then $v_3$, $v_4$, $v_5$, and so on. If n is not an exact multiple of 3, the final one or two vertices are ignored. Referring to FIG. 2C, triangles 206 include a triangle 205A defined by vertices $v_0$, $v_1$ and $v_2$, and triangle 205B defined by vertices $v_3$, $v_4$ and $v_5$. As shown, the triangles 205A and 205B do not have common vertices; that is, they are independent primitives.

Figure 2D:
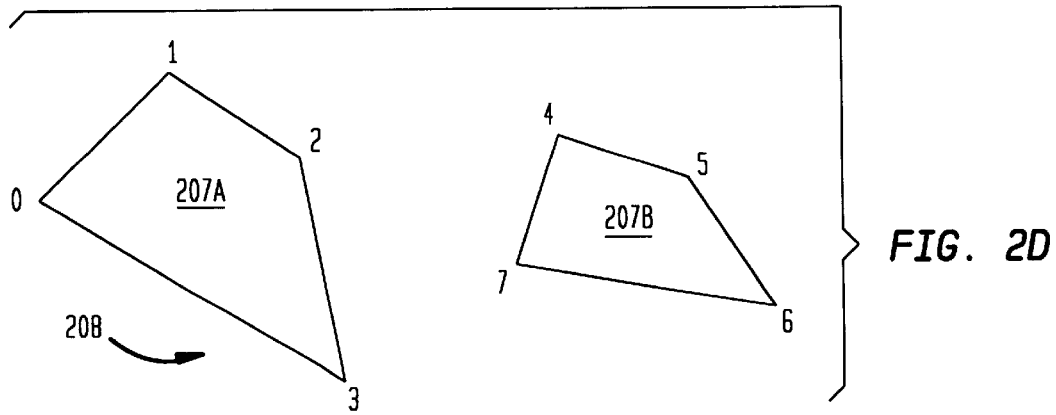
FIG. 2D is a diagram of a series of independent quadrilateral primitives which may be rendered on a computer display screen.

The command glBegin(GL_QUADS) specifies quadruples of vertices interpreted as four-sided polygons. Specifically, the command causes the graphics system 100 to draw a series of quadrilaterals (four-sided polygons) using vertices $v_0$, $v_1$, $v_2$, $v_3$, then $v_4$, $v_5$, $v_6$, $v_7$, and so on. If n is not a multiple of 4, the final one, two, or three vertices are ignored. Referring to FIG. 2D, the quadrilaterals 208 include a quadrilateral 207A drawn between vertices $v_0$, $v_1$, $v_2$, and $v_3$ and quadrilateral 207B drawn by vertices $v_4$, $v_5$, $v_6$, and $v_7$. As shown, the quadrilaterals 207A and 207B do not share a common vertex and are, therefore, independent quadrilaterals.

Figure 2E:
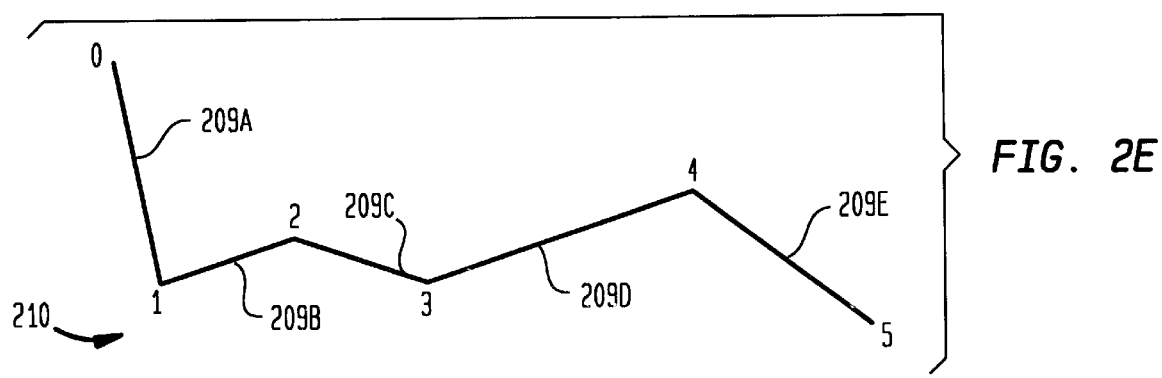
FIG. 2E is a diagram of a line strip primitive which may be rendered on a computer display screen.

The command glBegin(GL_LINE_STRIP) specifies a series of connected line segments. Specifically, the command draws a line segment from $v_0$ to $v_1$, then from $v_1$ to $v_2$, and so on, finally drawing the segment from $v_{n-2}$ to $v_{n-1}$ Thus, a total of n−1 line segments are drawn. Nothing is drawn unless n is larger than 1. There are no restrictions on the vertices describing a line strip primitive; the lines can intersect arbitrarily. Referring to FIG. 2E, line strip 210 is comprised of line 209A drawn between vertices $v_0$ and $v_1$, line 209B drawn between vertices v, and $v_2$, line 209C drawn between vertices $v_2$ and $v_3$, line 209D drawn between vertices $v_3$ and $v_4$ and line 209E drawn between vertices $v_4$ and $v_5$. As shown, each of these lines 209A–209E are connected to form a single line strip 210 primitive.

Figure 2F:
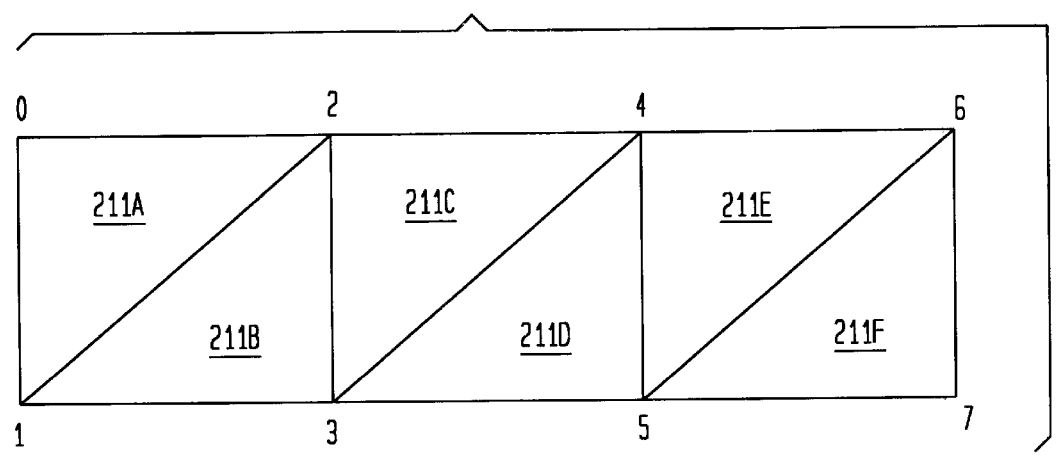
FIG. 2F is a diagram of a triangle strip primitive which may be rendered on a computer display screen.

The command glBegin(GL_TRIANGLE_STRIP) specifies a linked strip of triangles. Specifically, the command causes the graphics system 100 to draw a series of triangles (three-sided polygons) using $v_0$, $v_1$, $v_2$, then $v_2$, $v_1$, $v_3$, then $v_2$, $v_3$, $v_4$, and on. The ordering is to ensure that the triangles are all drawn with the same orientation so that the strip can correctly form part of a surface. n must be at least 3 for anything to be drawn. Referring to FIG. 2F, triangle strip 212 is comprised of triangle 211A drawn between vertices $v_0$, $v_1$ and $v_2$, triangle 211B drawn between by vertices $v_1$, $v_2$ and $v_3$, triangle 211C drawn between defined by vertices $v_2$, $v_3$ and $v_4$, triangle 211D drawn between vertices $v_3$, $v_4$ and $v_5$, triangle 211E drawn between vertices $v_4$, $v_5$ and $v_6$ and triangle 211F drawn between vertices $v_5$, $v_6$ and $v_7$. As shown, the triangles 211A–211F are drawn with the same orientations to form a triangle strip primitive 212.

Figure 2G:
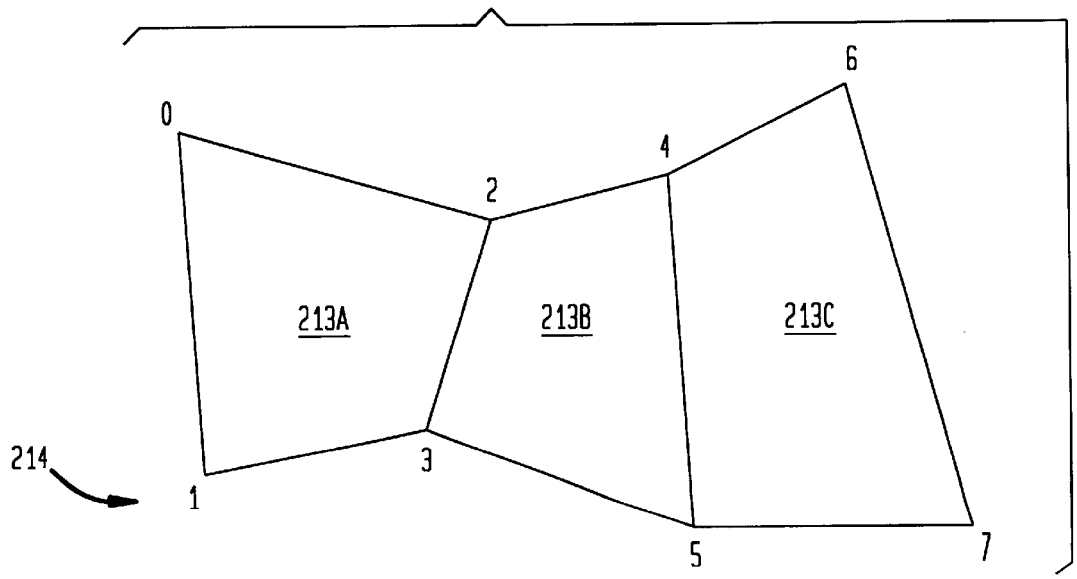
FIG. 2G is a diagram of a quadrilateral strip primitive which may be rendered on a computer display screen.

The command glBegin(GL_QUAD_STRIP) specifies a linked strip of quadrilaterals. Specifically, the command causes the graphics system 100 to draw a series of quadrilaterals (four-sided polygons) beginning with $v_0$, $v_1$, $v_3$, $v_2$, then $v_2$, $v_3$, $v_5$, $v_4$, then $v_4$, $v_5$, $v_7$, $v_6$, and so on. n must be at least 4 before anything is drawn. If n is odd, the final vertex is ignored. Referring to FIG. 2G, the quadrilateral strip 214 is comprised of quadrilateral 213A drawn between vertices $v_0$, $v_1$, $v_2$ and $v_3$, quadrilateral 213B drawn between vertices $v_2$, $v_3$, $v_4$, and $v_5$, and quadrilateral 213C drawn between vertices $v_4$, $v_5$, $v_6$ and $v_7$. As shown, neighboring quadrilaterals have two shared vertices and, therefore, share a common side with at least one neighboring quadrilateral.

Figure 2H:
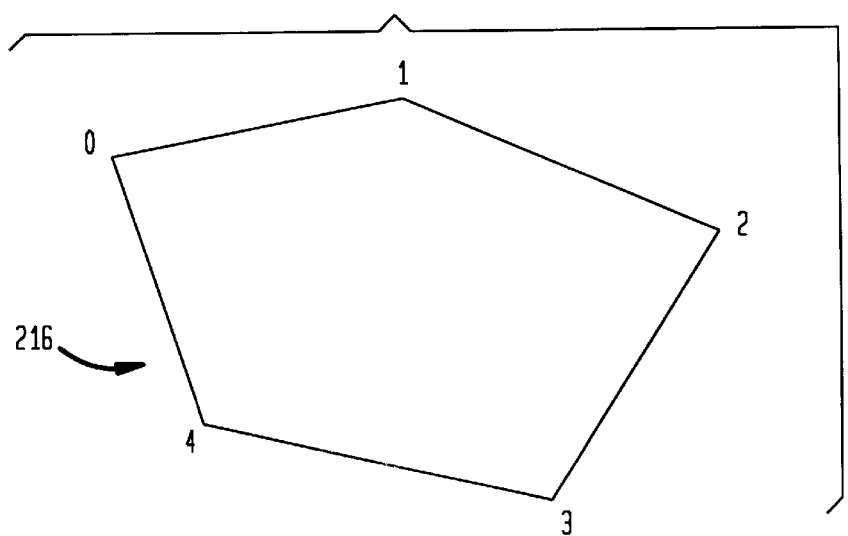
FIG. 2H is a diagram of a polygon primitive which may be rendered on a computer display screen.

The command glBegin(GL_POLYGON) specifies the boundary of a simple, convex polygon. Specifically, the command causes the graphics system 100 to draw a polygon using the points $v_0$, . . . , $v_{n-1}$, as vertices. n must be at least 3, or nothing is drawn. If the vertices do not satisfy these conditions, the results are unpredictable. Referring to FIG. 2H, polygon 216 is defined by vertices $v_0$, $v_1$, $v_2$, $v_3$ and $v_4$. As shown, the polygon 216 is convex; that is, a line connecting any two points within the polygon 216 does not intersect any boundary of the polygon.

Figure 2I:
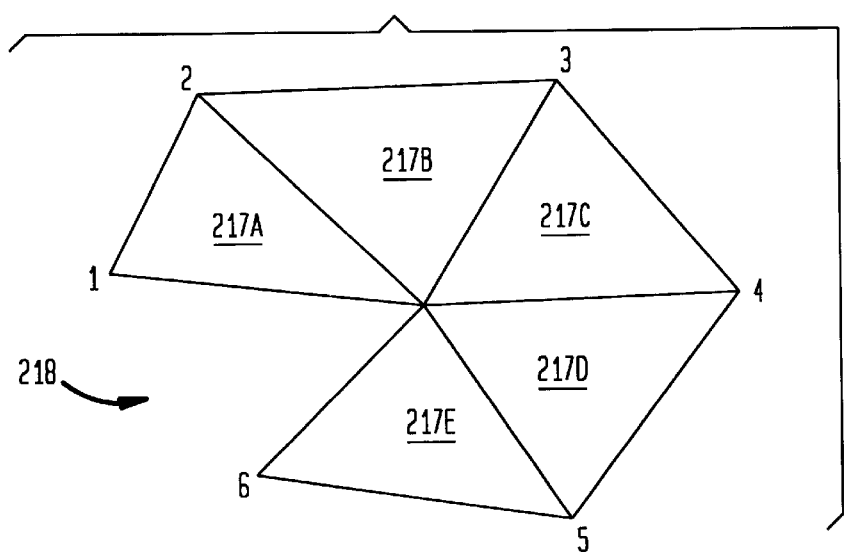
FIG. 2I is a diagram of a triangle fan primitive which may be rendered on a computer display screen.
Figure 2J:
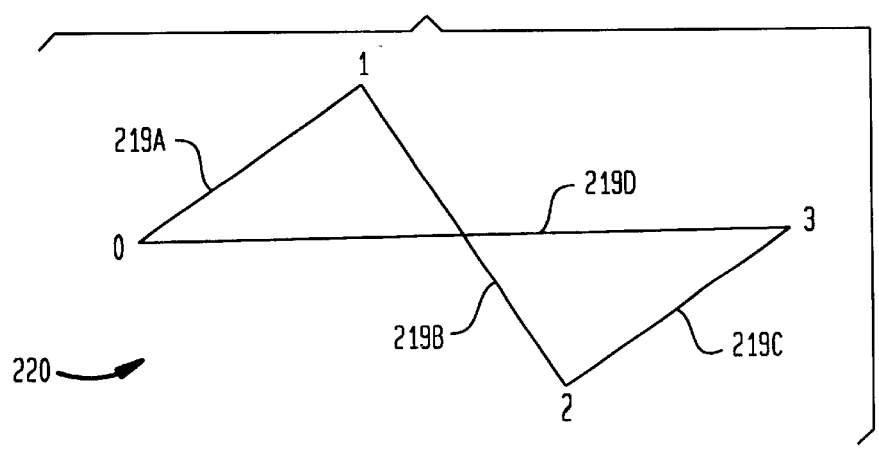
FIG. 2J is a diagram of a line loop primitive which may be rendered on a computer display screen.

The command glBegin(GL_TRIANGLE_FAN) specifies a linked fan of triangles. Specifically, the command causes the graphics system 100 to draw a series of triangles (three-sided polygons) using $v_0$, $v_1$, $v_2$, then $v_0$, $v_2$, $v_3$, then $v_0$, $v_3$, $v_4$, and so on. n must be at least 3 for anything to be drawn. Referring to FIG. 2I, the triangle fan 218 includes triangle 217A drawn between vertices $v_0$, $v_1$ and $v_2$, the triangle 217B drawn between vertices $v_0$, $v_2$ and $v_3$ the triangle 217C drawn between vertices $v_0$, $v_3$ and $v_4$, the triangle 217D drawn between vertices $v_0$, $v_4$ and $v_5$ and the triangle 217E drawn between vertices $v_0$, $v_5$ and $v_6$. As shown, neighboring triangles have two common vertices, vertex 0 and one other vertex.

The command glBegin(GL_LINE_LOOP) specifies a series of connected line segments, with a segment added between the last and first vertices. Specifically, the command causes the graphics system 100 to draw a line segment from $v_0$ to $v_1$, then from $v_1$ to $v_2$, and so on, drawing a line segment from $v_{n-2}$ to $v_{n-1}$ When the glEnd (1) is received, a final line segment is drawn from $v_{n-1}$ to $v_0$, completing the line loop. Thus, a total of n line segments are drawn. Nothing is drawn unless n is larger than 1. There are no restrictions on the vertices describing a line loop; the lines can intersect arbitrarily. For example, referring to FIG. 2J, a line loop 220 is comprised of line segment 219A drawn between vertices $v_0$ and $v_1$, line 219B drawn between vertices v, and $v_2$, line 219C drawn between vertices $v_2$ and $v_3$ and line 219D drawn between vertices $v_3$ and $v_0$. As shown, the final line segment, line 219D, completes the line loop primitive 220.

As noted, graphics systems in general, and OpenGL specifically, behave as a state machine. Accordingly, a specified state value remains in effect until it is changed, with all subsequently-received vertices being rendered with the current state value. As a result, when the graphics vertex call (glVertex( ) in OpenGL) is issued, the currently state value is used to render the specified vertex. States may include, for example, the normal vector coordinates, texture coordinates, current viewing and projections transformations, line and polygon stipple patterns, polygon drawing modes, pixel-packing conventions, positions and characteristics of lights, and material properties of the objects being drawn, to name a few. Typically, states are enabled or disabled with the graphics calls glEnable( ) and glDisable( ), respectively. The text appearing within the brackets represents the type of property and the state value which is being enabled or disabled.

C. Performance Optimization System

Figure 3:
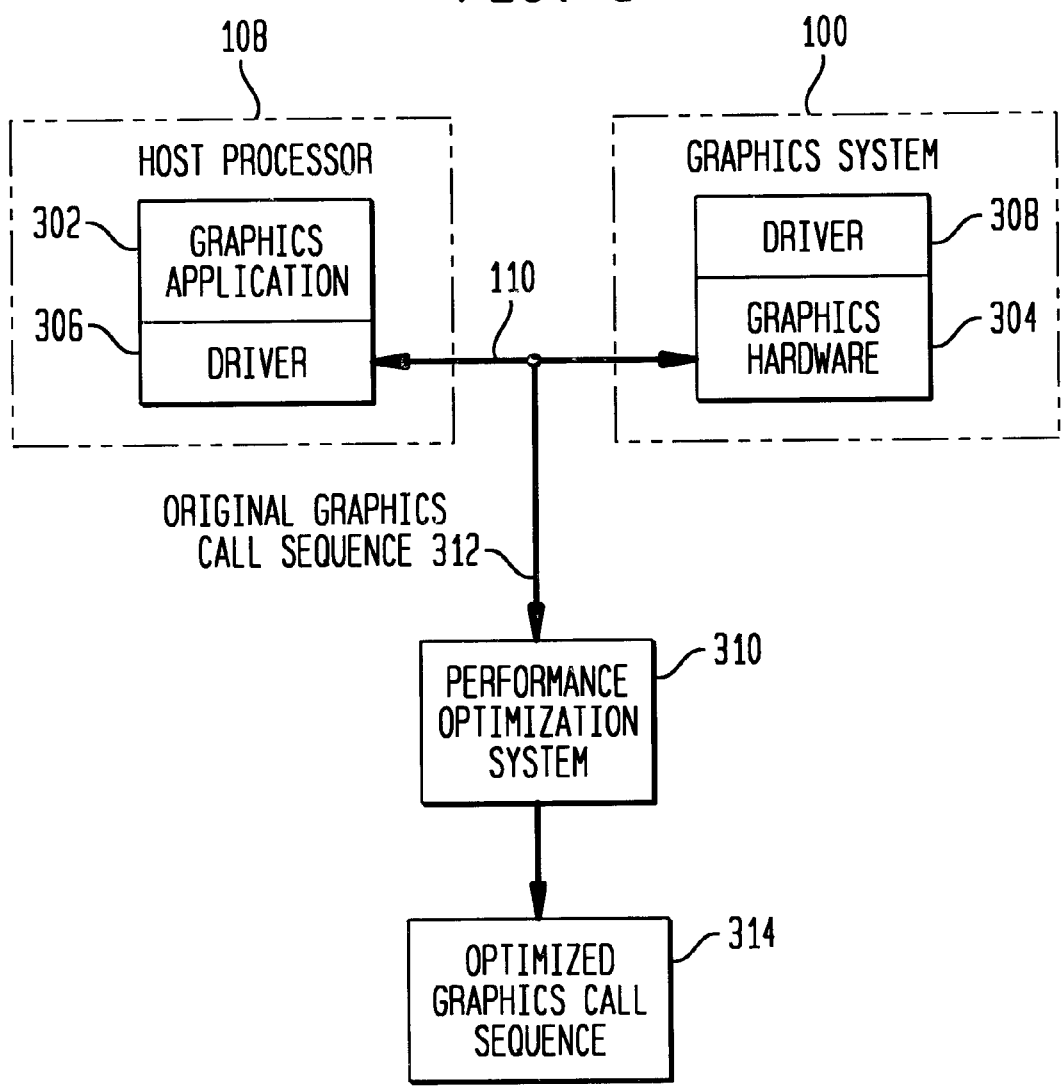
FIG. 3 is a block diagram illustrating the performance optimization system of the present invention implemented so as to assess the performance of the graphics application and driver with the graphics system and associated driver.

FIG. 3 is a block diagram illustrating the performance optimization system of the present invention implemented so as to assess the performance of the graphics application 302 and driver 306 on the host processor 108, as well as the driver 308 and graphics hardware 304 in the graphics system 100. As will be explained in detail below, the performance optimization system 310 captures graphics call sequences occurring on the bus 110 between the host processor 108 and the graphics system 100, and through the implementation of one or more graphics call sequence optimizers on the captured graphics call sequence 312, generates an optimized graphics call sequence 314 that provides for the same rendering by the graphics system 100 as the original graphics call sequence 312. As used herein, a graphics call sequence refers to one or more graphics calls generated by the driver 306 on the host processor 108 in accordance with the implemented graphic API, here the OpenGL API.

The performance optimization system 310 overcomes the noted drawbacks to conventional performance optimization identification and assessment techniques. The graphics application 302 and associated graphics interface driver 306 may be analyzed by the application developer to identify specific modifications which, when implemented, would generate such an optimized graphics call sequence 314. This may include implementing specific modifications to the graphics application 302 as well as implementing portions or all of the present invention into the drivers for real-time execution.

Furthermore, the performance optimization system 310 enables the application developer to easily and non-invasively assess targeted graphics performance optimizations subsequently made to the graphics application 302 or the associated driver 306 based upon the optimized graphics call sequence 314. Significantly, the performance optimization system 310 allows for consideration of the performance improvement, if any, in the graphics system 100 which would result from implementation of such performance optimizations. Only the desired performance optimizations are then implemented, avoiding the inefficient process of prototyping potential performance optimizations without a full appreciation of the resulting changes in graphics system performance. The performance optimization system 310 can also be used to identify usages of the graphics interface commonly invoked by the graphics application. This information can then be used by a graphics system vendor to optimize the underlying software or hardware in the graphics system 100 to improve the performance of such common graphics interface usages.

Generally, the performance optimization system 310 captures a graphics call sequence 312 generated by the graphics application 302. The graphics call sequence is compiled and its performance measured to obtain a performance baseline against which potential optimizations will be compared. Typically, the performance of the original graphics call sequence 312 is evaluated in some known manner, depending upon the desired performance characteristics. For example, performance may be based on execution time, the number of hardware state changes required to render a particular primitive, or the amount of memory the graphics call sequence requires.

The original graphics call sequence 312 optimized in accordance with the present invention, as described in detail below, to generate the optimized graphics call sequence 314. The optimized graphics call sequence 314 is compiled and performance evaluated in a similar manner as the original graphics call sequence 312 was evaluated. The performance of the optimized graphics call sequence 314 is then compared to the baseline. The benefit of the potential graphics optimizations can then be assessed without having to implement modifications to the graphics application 302 or associated driver 306. The above compilation and performance evaluation are considered to be well known to those of ordinary skill in the art, and are not described further herein.

Figure 4:
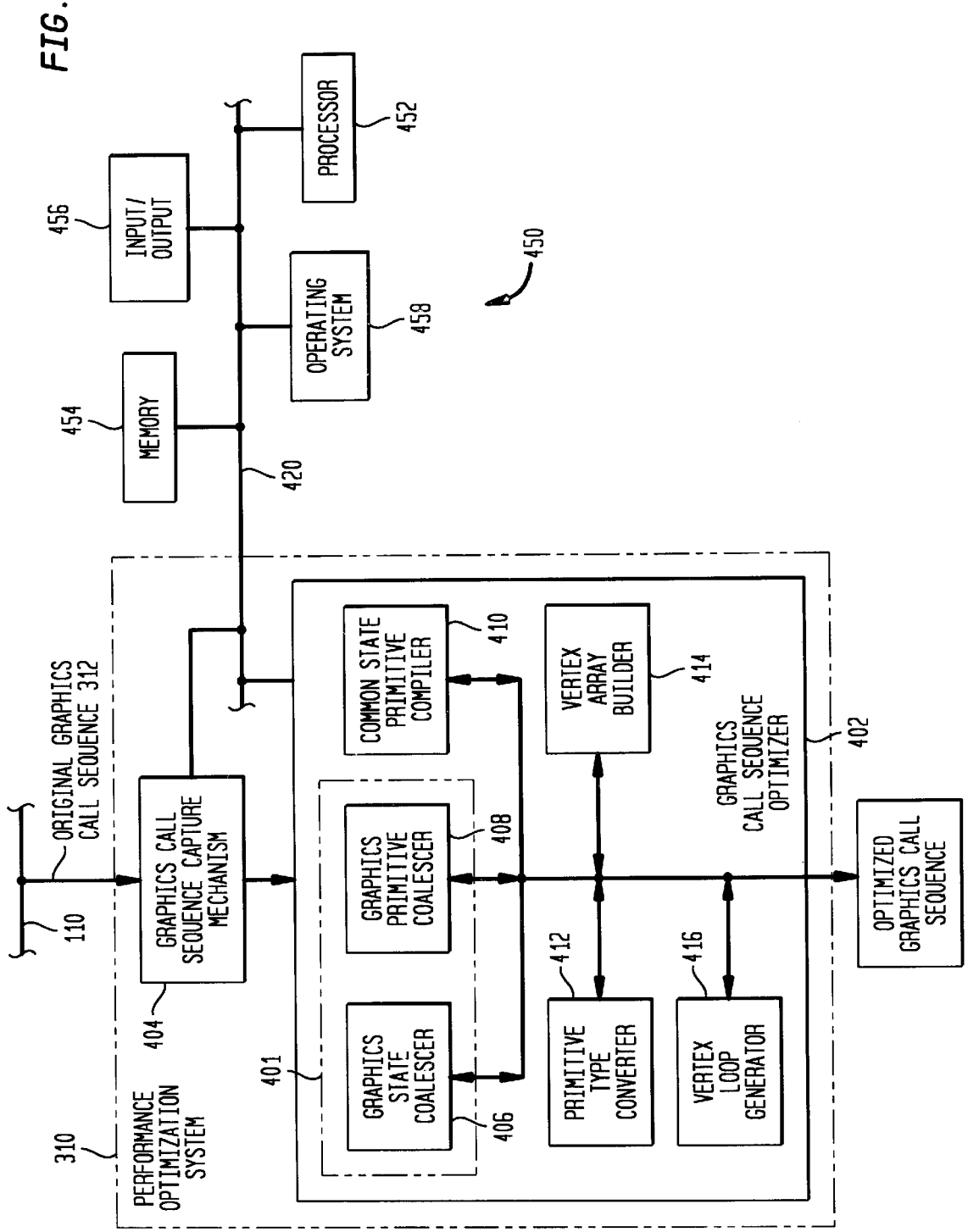
FIG. 4 is a functional block diagram of one embodiment of the performance optimization system implementing the graphics call sequence optimizers of the present invention.

FIG. 4 is a high level functional block diagram of one embodiment of the performance optimization system 310. The system 310 includes a graphics call sequence optimizer 402 that operates on the captured graphics call sequence 312 obtained from the graphics environment by the graphics call sequence capture mechanism 404. The optimizer 402 includes a plurality of different optimizers, one or more of which may operate on all or a portion of the captured graphics call sequence 312 to generate the optimized graphics call sequence 314.

As will become apparent by the following detailed description, the individual optimizers in the graphics call sequence optimizer 402 may be performed in any desired sequence, and may utilize the results of any other optimizer 402. Accordingly, the optimizers 406–416 are shown having an output and input connected to the same internal communication medium to schematically illustrate the possible flow of optimized graphics call sequences. In this manner the performance benefits of each type of optimizer may be individually evaluated and, if desired, combined with the results of other optimizers. In operation, the graphics call sequence capture mechanism 404 captures a sequence of graphics calls 312 from the bus 110. These graphics calls may be captured using a variety of well known non-invasive methods, such as the oglebug tool commonly available on SGI, IBM, HP and other graphics systems. The captured graphics calls sequence 312 is stored in memory for subsequent processing by the performance optimization system 310 of the present invention.

The performance optimization system 310 is preferably one or more software programs implemented on a conventional computer 450. The computer system 450 is a commonly-available computer system including a processor 452, a memory unit 454, input/output interface devices 456, and, preferably, a display (not shown). The memory 454 is used for storage of program instructions and for storage of results of calculations performed by the processor 452. In a preferred embodiment, the memory 454 includes random access memory (RAM), a hard disk drive and a floppy disk drive. The inputs/output interface devices 456 may be modem cards, network interface cards, sound cards, etc.

The processor 452 is typically a commercially available processor such as the Pentium microprocessor, PowerPC microprocessor, SPARC processor, PA-RISC processor or a 68000 series microprocessor. Many other processors are also available. Such a processor usually executes a program referred to as an operating system 458 such as the various versions of the Windows, Unix and NetWare operating systems. The operating system 458 controls the execution of other computer programs and provides scheduling, input/output control, file and data management, memory management and related services. The processor 452 and operating system 458 define a computer platform for which application programs and high-level programming languages are written. The elements of the system 450 communicate with each other via one or more buses 420.

The software routines for performing the performance optimization identification and evaluation methodology in accordance with the present invention typically reside in memory 454, and may be stored on a computer-readable medium such as, for example, magnetic disk, compact disk, or magnetic tape, and may be loaded into the computer system 450 using an appropriate peripheral device as is known in the art.

Preferably, the system 310 is implemented in any well-known programming language such as C or C++. Those skilled in the relevant art will appreciate that different implementations, including different function names, programming languages, data structures, and/or algorithms may also be used in embodiments of the present invention other than those described below. It should be further understood that the invention is not limited to a particular computer platform, particular operating system, particular processor, or particular high-level programming language, and that the hardware components identified above are given by way of example only. Portions of the performance optimization system 310 may be implemented, for example, in dedicated hardware, firmware, or any combination thereof.

In the exemplary embodiment illustrated in FIG. 4, the graphics call sequence optimizer 402 include a graphics state call coalescer 406, a graphics primitive coalescer 408, a common state primitive compiler 410, primitive type converter 412, vertex array builder 414, and vertex loop generator 416. Each of these will be described in detail below.

The graphics state call coalescer 406 determines whether a given continuous series of graphics state calls in the captured graphics call sequence 312 contains redundant, conflicting or otherwise unnecessary graphics state calls and, if so, eliminates the unnecessary graphics state calls so as to reduce the total number of graphics state calls in that continuous series. Generation of such an optimized series of graphics state calls by the graphics application 302 would reduce the number of state changes invoked in the graphics system 100, thereby reducing the overhead associated with the particular continuous series of graphics state calls.

The state coalescing process is performed only on a continuous series of graphics state calls. This includes any sequence of graphics state calls that occurs between other graphics calls that cause the graphics system 100 to apply the state values that are currently-effective in the graphic system to primitives which are to be rendered. The currently-effective state values are referred to herein as current state values. All other types of graphics calls, such as graphics calls that change the value of an attribute, referred to herein as graphics attribute calls, do not cause the current state values to be applied to the primitives and, as such, may be included in the continuous series of graphics state calls operated upon by the coalescer 406 with no effect thereto.

In the illustrative embodiment, the graphics calls which demarcate the continuous series of graphics state calls includes graphics primitive calls. In one embodiment of the invention, a graphics frame call could also cause the graphics system to apply the current state values to the primitives which are to be rendered and, a such, would included in the such graphics calls. It should be understood that in other graphics systems there may be additional types of graphics calls which do not result in the application of the current state values to the primitives and, therefore, may be included in the continuous series of graphics state calls processed by the graphics state coalescer 406.

The graphics primitive coalescer 408 coalesces the graphics vertex calls contained in a continuous series of primitive command sets that render primitives of the same type. The graphics primitive calls that comprise a primitive command set include the glBegin( )/glEnd( ) graphics call pair as well as the intervening graphics vertex calls. Other graphics calls such as graphics attribute calls may exist in the vertex-data list between the glBegin( )/glEnd( ) pair and are not of concern to the graphics primitive coalescer 408 and are coalesced along with their associated graphics vertex calls. When such a continuous series of primitive command sets is identified, the intermediate glBegin( )/glEnd( ) pairs are removed, coalescing the graphics vertex calls between a single glBegin( )/glEnd( ) pair with a single vertex-data list comprising all of the graphics vertex calls in the original continuous series of graphics primitive calls.

As noted above, certain primitives may be rendered in a strip form. These include line, triangle and quadrilateral strips. As described above, each discrete primitive in each type of strip shares at least one common vertex with a neighboring discrete primitive of the strip. Rendering such vertices twice requires unnecessary duplicative operations to be performed by the graphics system 100. In accordance with one embodiment of the graphic coalescer primitive coalescing-process of the present invention, the graphics primitive calls may be further coalesced to eliminate the graphics vertex calls rendering redundant vertices if the proper number of common vertices exist between neighboring discrete primitives. Such a modification would necessarily include altering the type of the glBegin( )/glEnd( ) pair to specify the primitive strip rather than the discrete primitive. Thus, the graphics primitive coalescer 408 optimizes the series of graphics primitive calls by eliminating the redundant processing associated with the duplicative glBegin( )/glEnd( ) pairs and duplicative vertices.

In one alternative embodiment, the graphics state coalescer 406 and the graphics primitive coalescer 408 are combined into a single coalescer as indicated by the dashed box 401 surrounding the two coalescers. Such a combined coalescer may reduce the number of separate optimizations that are applied to each original graphics call sequence 312 and may be beneficial when such coalescing is likely to be implemented. However, the advantages of performing each optimization 406, 408 separately lies in the ability for an operator to clearly identify the performance of each optimization without being masked by other optimizations. This allows for accurate assessment of the cost effectiveness of each optimization before making changes to the graphics application 302 or host driver 306.

The common state primitive compiler 410 remedies frequent toggling of state values by the graphics application 302. Oftentimes, a state value will be set to a particular value to render a number of primitives, followed by the setting of the same state to another value to render additional primitives. Subsequently, the same state is again changed to the original value tp render still additional primitives. Such toggling of state values results in duplicative graphics state calls being implemented by the graphics system 100.

The common state primitive compiler 410 reduces the state changes invoked in the graphics system 100 by compiling a continuous series of primitive command sets that are to be rendered with the same state values. The continuous series of primitive command sets appears in the captured graphics call sequence 312 with one or more graphics state calls preceding them. The continuous series of graphics state calls and primitive command sets occurs between graphics calls or other conditions that cause the rendering of the primitives with their respective current state values. Typically, this includes graphics frame calls. However, in other graphics systems there may be other types of graphics calls that require graphics primitive rendering and, therefore, may demarcate the continuous series of graphics state and primitive command sets optimized by the compiler 410.

The compiler 410 compiles all primitive command sets that are to be rendered with the same state values and outputs the compiled list to the optimized graphics call sequence, preceded by the graphics state calls necessary to establish the common state values. Generation of such an optimized graphics call sequence will cause all requisite graphics state calls for a series of primitives to be issued once prior to the rendering of the series of primitives. This significantly reduces the toggling of graphics states and the the overhead associated with such state changes.

The primitive type converter 412 converts the primitive type specified in a primitive command set from a non-combinable primitive type to combinable primitive type. Non-combinable primitive types are those primitives that cannot be coalesced by the graphics primitive coalescer 408. The specified primitive types which are non-combinable are a function of the implemented graphics interface. In the embodiment wherein the graphics interface is the OpenGL API, the group of non-combinable graphics primitives types include line strips, triangle strips, quadrilateral strips and polygon primitive types. The manner in which the vertices are processed in accordance with the OpenGL API described above with reference to FIGS. 2A–2J require separate primitive command sets. However, it is not uncommon for graphics applications 302 to generate a primitive command set that specifies a non-combinable primitive type when the vertices contained within the primitive command set could also be typed as a combinable primitive type.

For OpenGL, the following non-combinable primitive types may be converted to combinable primitive types for the noted number of graphics vertex calls.

| Non-combinable Primitive Type | Vertices | Combinable Primitive Type |
|---|---|---|
| polygons | 3 | triangles |
| line strip | 2 | lines |
| triangle strip | 3 | triangles |
| quadrilateral strip | 4 | quadrilaterals |
| polygons | 4 | quadrilaterals |
| triangle fans | 3 | triangles |
| line loop | 2 | lines |

Converting the type of the specified primitive involves replacing the non-combinable primitive type with the combinable equivalent in the glBegin( ) graphics call.

The vertex array builder 414 creates a vertex array having vertices identified in a series of graphics vertex calls of a primitive command set, and generates the associated pointer for reference by a graphics array call that uses the array of vertices to render a number of specified primitives. The vertex array builder 414 operates on primitive command sets as defined herein. The command set may contain any number of graphics vertex calls. The occurrence of graphics calls that causes the primitives to be rendered or a state to be changed terminates the application of the vertex array builder 414 to the primitive command set. In an exemplary embodiment, such graphics calls include graphics frame calls and graphics state calls as defined herein. It should be understood that in other graphics systems there may be other types of graphics calls that terminate the application of the vertex array builder 414, depending upon the chosen graphics interface. Other graphics calls such as graphics calls that change vertex attributes are not processed by vertex array builder 414, and are processed in any convention or other known manner.

Establishing such an array and providing such graphics calls reduces the number of graphics calls that are sent to the graphics system 100 to render a desired series of graphics primitives. Furthermore, such an approach utilizes available high performance array processing capabilities provided by the OpenGL API, reducing the processing time that would have been incurred in processing a long series of graphics primitive calls.

The vertex loop generator 416 is applied to any repetitive series of graphics calls occurring in a primitive command set. The vertex loop generator 416 generates a repeatable loop to efficiently process repetitive series of graphics calls. This optimization is typically implemented after all other previously described optimizations have been implemented. This optimization has the advantage of converting graphics calls occurring in a primitive command set into a form that, because of cache behavior and other factors, yields performance results similar to the graphics application. Modeling cache behavior employed in present day computing systems enhances the value of the performance characteristic analysis made between the original graphics call sequence and the optimized graphics call sequence.

The functions and operations of each of the optimizers 406–416 will be further described with reference to the processes performed by each optimizer 406-416. In the following description , exemplary graphics call sequences 312 and 314 are illustrated. Each such exemplary sequence illustrates only those graphics calls of relevance to the optimizer process being described. It should be understood that other graphics calls would be appear in a captured graphics call sequence 312 and optimized graphics call sequence 314 generated in accordance with the present invention.

D. Graphics State Coalescing Processes

FIG. 5A is a high level flow diagram of one embodiment of the graphics state coalescing process 500 performed in accordance with the present invention. As noted, the state coalescing process 500 eliminates or removes from a given continuous series of graphics state calls all redundant, conflicting or otherwise unnecessary graphics state calls so as to reduce the total number of graphics state calls in that continuous series. The continuous series of graphics state calls includes, as noted, any sequence of graphics state calls that occurs between the application of state values to primitives.

There are two primary steps performed to coalesce graphics state calls in accordance with this embodiment of the present invention. At block 502 ineffective graphics state calls are removed from the optimized graphics call sequence. A particular state may be changed any number of times during such a continuous series of graphics state calls, with only the state value specified in the most recently occurring graphics state call being applied to subsequently-received graphics primitives. Thus, only the latter state value is of consequence and would have any effect on the rendering of the subsequently-received primitives. The former graphics state calls are, therefore, removed from the continuous series of graphics state calls.

Once the state values which would result from this continuous series of graphics state calls is determined, they are then compared with the current state values in the graphics system at block 504. Multiple graphics state calls in a continuous series of graphics state calls may alter a state value from a current state value to another state value and then again to the original (still current) state value. Such multiple graphics state calls do not have to be provided to the graphics system since that state currently has the value resulting from the continues series of graphics state calls. Accordingly, these graphics state calls are removed from the continuous series of graphics state calls and only the remaining graphics state calls, which are graphics state calls that will effect an actual change in the graphics system, are retained. This results in an optimized series of graphics state calls that effect an equivalent result in the graphics system 100 while invoking the minimal number of changes in the in the graphics system 100.

Figure 5B:
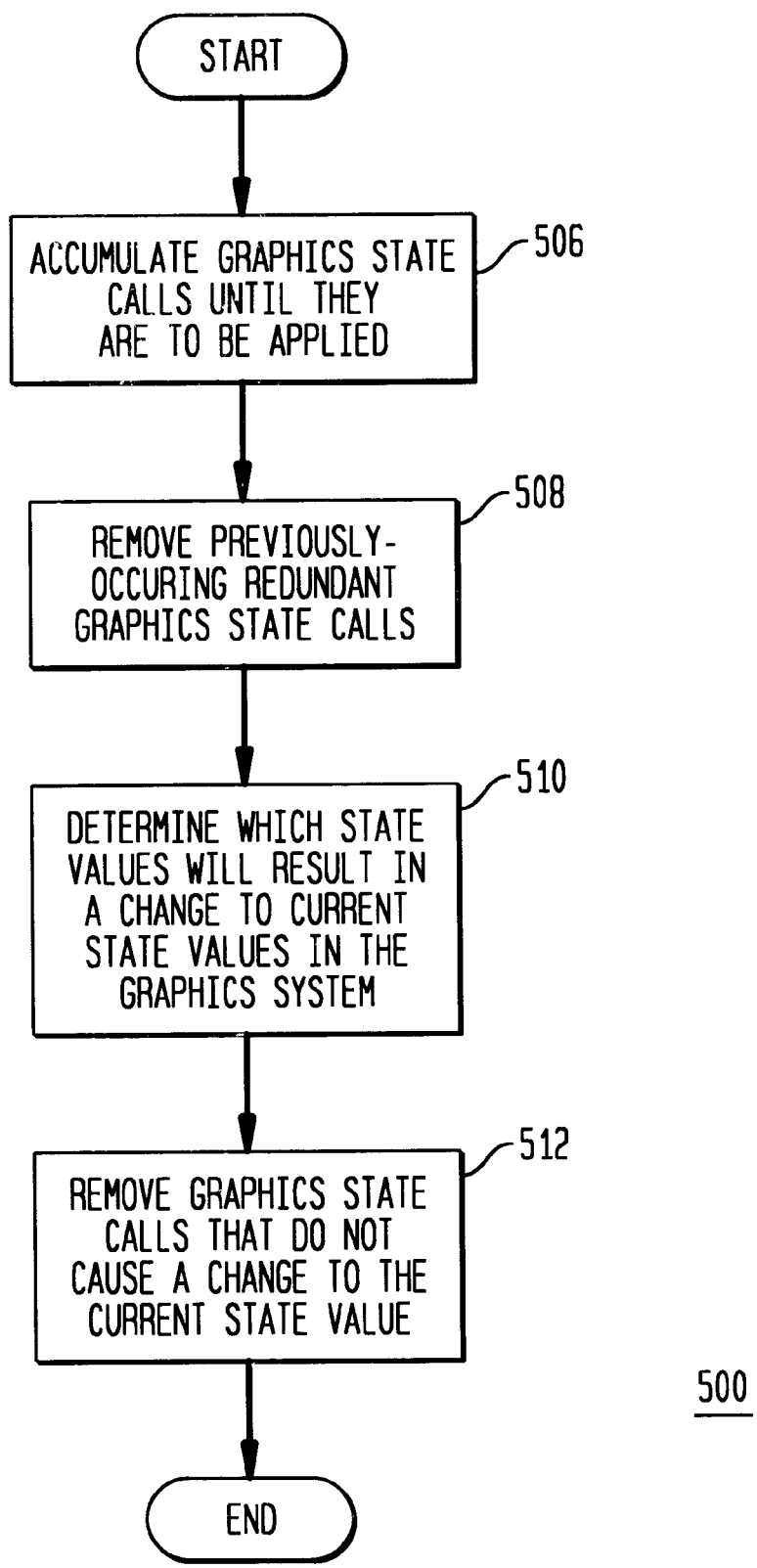
FIG. 5B is a low level flowchart of one embodiment of the state coalescing process of the present invention.

A more detailed flow chart of the graphics state coalescing process 500 is shown in FIG. 5B. This flow chart will be described with reference to exemplary original graphics call sequence 550 and optimized graphics call sequence 554 shown in FIG. 5C. In FIG. 5C an original graphics call sequence 550 contains 8 continuous graphics state calls 552A–552H. An optimized graphics call sequence 554 generated by the present invention, contains 2 graphics calls 556A–556B that provides for the same rendering by the graphics system 100 as would have been achieved by implementing the original graphics call sequence 550.

At block 506, the graphics state calls are accumulated until a graphics call in the captured sequence indicates that the graphics state values are to be applied to the primitives. As noted, in the exemplary embodiment, this may be a graphics primitive or graphics frame call, although other graphics calls may qualify in other implementations. The accumulated graphics state calls are those that are continuously received between such graphics calls. Referring to FIG. 5C, 8 such graphics calls 552A–552H have been accumulated in the illustrated original graphics stall call sequence.

At block 508, all redundant graphics state calls other than the latest-occurring redundant graphics state callin the continuous series of graphics state calls is removed from the optimized graphics call sequence. This, as noted, eliminates all conflicting state changes, applying only the most recently generated graphics state call for each particular state addressed in the continuous series of graphics state calls.

Referring to FIG. 5C, two graphics state calls set the glShadeModel property: graphics state call 552A and graphics state call 552H. The former graphics state call sets the state value to smooth (GL_SMOOTH) and the latter sets the same state value to flat (GL_FLAT). After this series of graphics state calls is implemented in the graphics system, all primitives will be rendered with a glShadeModel state value of GL_FLAT. Thus, only that graphics state call needs to be supplied to the graphics system 100. Accordingly, the optimized graphics call sequence 554 include a graphics state call 556A of glShadeModel setting the state value to GL_FLAT. Similarly, the GL_LIGHT0 state is enabled twice by graphics state commands 552B and 552E. Accordingly, only one such graphics state command 556B is included in the optimized command set 554.

This is followed by a determination, at block 510, as to which graphics state calls cause a change to a current state value. At block 512 those graphics state calls that do not cause a change in a current state value of the graphic system are removed from the graphics call sequence. Referring to FIG. 5C, the implementation of these two steps 510 and 512 on the exemplary original graphics call sequence 550 results in the reduction of 4 graphics state calls in the optimized graphics call sequence 554.

Two properties, GL_LIGHT1 and GL_DEPTH_TEST are first enabled by graphics state calls 552C and 552D, respectively, and subsequently disabled in the graphics state call sequence 550 by graphics state calls 552F and 552G respectively. Thus, the disabling of these two state values would result in the states having the same value as the current state values in the graphics system which were in effect prior to the receipt of the original graphics call sequence 550. Since implementing such a sequence of graphics state calls would not change the current state values in the graphics system, they are eliminated and do not appear in the optimizied graphics call sequence 554. Thus, the optimized graphics call sequence 554 provides significantly fewer graphics state calls to the graphics system 100 and, as such, results in considerably less resources being utilized by the graphics system 100 to achieve the rendering provided by the original graphics state call sequence 312.

Figure 5D:
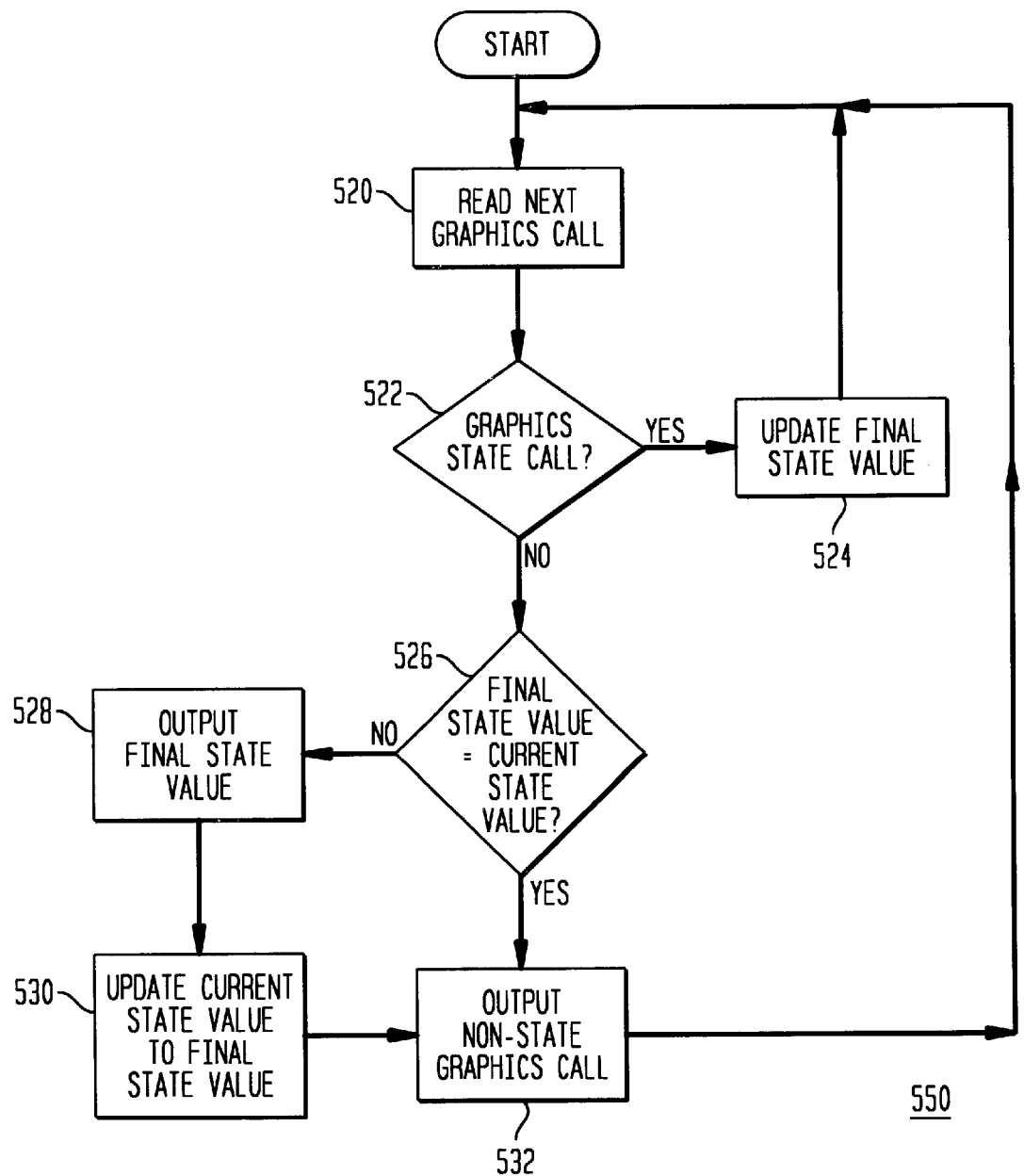
FIG. 5D is a detailed flowchart of one embodiment of the implementation of the state coalescing process of the present invention.

FIG. 5D is a detailed flow chart of one implementation of a state coalescing process 550 that may be implemented in the exemplary graphics environment illustrated in FIG. 1 wherein the OpenGL API is implemented. At block 520 each graphics call from the captured graphics call sequence 312 is retrieved. This may be achieved by variety of commonly known methods, such as placing the captured graphics call sequence 312 into a stack in memory 454 and sequentially removing the individual graphics calls as needed.

At block 522 each graphics state call is analyzed to determine whether it is a graphics state call or a non-state graphics call. If the graphics call is a graphics state call then a final state value for the specified state is updated in accordance with the graphics state call at block 524. This final state value may be stored in a variety of known memory devices such as memory 454 and accessed in any known manner. Referring to FIG. 5C, this would result in the following final values for the graphics state calls 554A–554H: glShadeModel=GL_FLAT; GL_LIGHT0= enabled; GL_LIGHT1=disabled; and GL_DEPTH_TEST- disabled.

If the graphics call is a non-state graphics call, then the final state values are compared to the current state values in the graphics system 100 at block 526. If the final state values are not the same as the current state values, the final state values are output at block 528 to create the optimized graphics call sequence 554. That is, outputting the final state value will only cause the generation of graphics state calls for those states which are different that the current state values. This would result in the elimination of the glDisable (GL_LIGHT1) and glDisable(GL_DEPTH_TEST) graphics state calls and final values since the GL_LIGHT1 and the GL_DEPTH_TEST states are currently disabled in the graphics system 100. Remaining in the optimized graphics call sequence 554 are the two graphics state calls glShadeModel(GL_FLAT) 556A and glEnable(GL_LIGHT0) 556B. By causing the graphics system 100 to implement a state change only for those states that have changed since the last state update, the overhead associated with graphics state changes is reduced.

If the current state value equals the final state value, then the current state is not updated and the non-state graphics call is output at block 532. This and all subsequent primitives will then be rendered in accordance with the optimized state values. Referring again to FIG. 5C, the exemplary optimized graphics call sequence 554 includes only two graphics state calls 556A and 556B, illustrating a significant reduction in the number of graphics state calls achieved by the state coalescing process of the present invention.

The state coalescing optimization just described coalesces states by continually updating a final state value at block 524. As described above, this state coalescing continues until it is determined that the last graphics call was a non-state graphics call at block 522. A non-state graphics call could, for example, be a graphics primitive call. Upon receipt of the non-state graphics call, the coalescing ends. The state coalescing process begins, or resumes operation, when another graphics state call appears.

E. Graphics Primitive Coalescing Processes

Figure 6A:
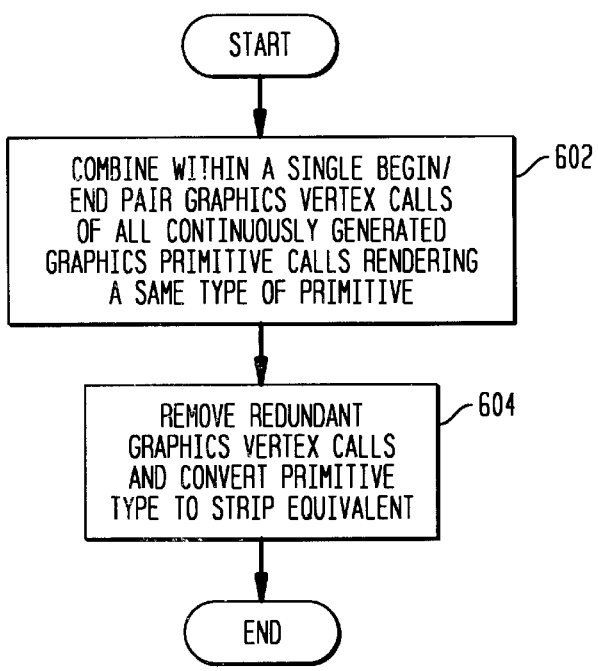
FIG. 6A is a high level flowchart of one embodiment of the primitive coalescing process of the present invention.

FIG. 6A is a high level flow diagram of one embodiment of the primitive coalescing process 600 performed in accordance with the present invention. There are two primary steps to coalesce graphics primitive calls. At block 602 the primitive state coalescing process 600 coalesces the graphics vertex calls contained in a continuous series of primitive command sets that render primitives of the same type. The intermediate glBegin( )/glEnd( ) pairs are removed, coalescing the graphics vertex calls into a single glBegin( )/glEnd( ) pair with a single vertex-data list comprising all of the graphics vertex calls in the original continuous series of primitive command sets. This causes the same discrete number of primitives to be rendered with a single primitive command set. This serves to reduce the number of glBegin( )/glEnd( ) pairs passed to the graphics system 100 and, thereby, reduces the overhead associated with processing separate primitive command sets to render a large number of primitives.

At block 604 the graphics primitive calls are analyzed to determine if the discrete primitives have common vertices and can form a primitive strip as defined above. If so, then the primitive coalescing process 600 further optimizes the resulting single glBegin( )/glEnd( ) pair by eliminating the redundant graphics vertex calls and changing the type of primitive identified in the glBegin( )/glEnd( ) pair to the equivalent primitive strip. This further optimizes the series of graphics primitive calls by eliminating the redundant processing associated with the duplicative vertices.

Figure 6B:
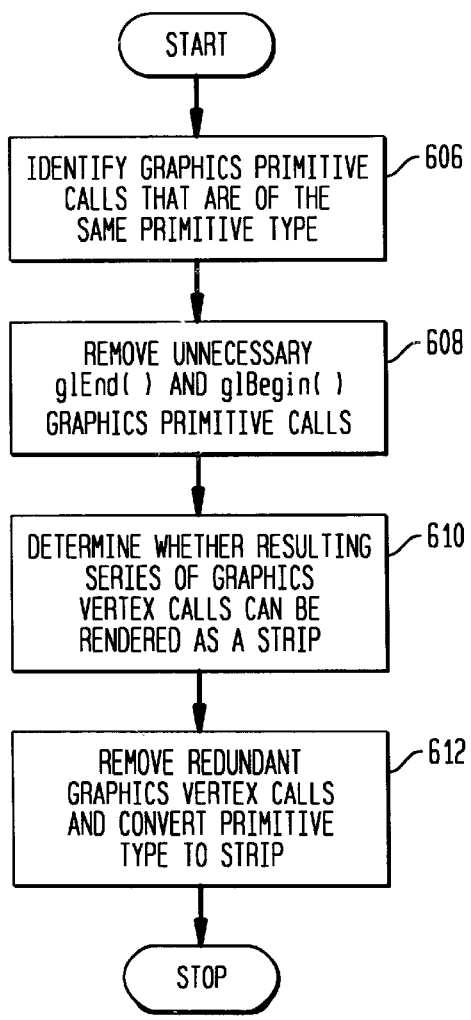
FIG. 6B is a low level flowchart of one embodiment of the primitive coalescing process of the present invention.

A more detailed flow chart of one embodiment of the primitive coalescing process is shown in FIG. 6B. This flow chart will described with reference to exemplary original and optimized graphics primitive call sequences 650, 654 and 664 shown in FIGS. 6C and 6D. At block 606 it is determined whether the captured graphics sequence 312 includes a continuous graphics primitive call sequence comprising at least one primitive command set for the same primitive type. Such continuous graphics primitive calls may occur until a graphics call sequence appears that does not specify the same primitive type as the graphics primitive calls being coalesced. As noted, in the exemplary embodiment, this may be either a non-primitive graphics call other than a graphics attribute call, or a graphics primitive call that is not of the same type currently being coalesced.

Referring to FIG. 6C an original graphics call sequence 650 contains 2 glBegin( )/glEnd( ) pairs 660, 662, each rendering a single triangle primitive, for a total of 10 continuous graphics primitive calls 652A–652J. The present invention generates an optimized graphics primitive sequence 654 containing 8 graphics primitive calls 656A–656H in only one glBegin( )/glEnd( ) pair that provides for the same rendering on a graphics system 100 as would have been achieved by implementing the original graphics call sequence 650. At step 606 the graphics state coalescer 416 determines that the illustrated 10 graphics primitive calls 652 occurred between non-primitive graphics calls or graphics primitive calls not of type GL_TRIANGLES.

If it is determined that the captured graphics calls include a continuous graphics primitive call sequence of more than one glBegin( )/glEnd( ) pair for the same primitive type, then at block 608 the intermediate glEnd( ) and glBegin( ) graphics calls are removed from the graphics primitive call sequence, with the first glBegin( ) and last glEnd( ) graphics calls remaining. Referring to FIG. 6C, the glBegin(GL_TRIANGLES) graphics primitive call 652A and the glBegin (GL_TRIANGLES) graphics primitive call 652F both identify the triangle primitive and, as such, identify primitive command sets that can be coalesced. The glEnd( ) graphics primitive call 652E and the glBegin(GL_TRIANGLES) graphics primitive call 652F are removed resulting in a vertex-data list 680 continuing the 6 graphics vertex calls 656B–656G analogous to the graphics vertex calls 652B-D and 652G-I.

At block 610, a determination is made as to whether the resulting optimized graphics primitive calls should be output as a series of discrete primitives of the same type or whether they can be rendered in a primitive strip. This, as noted, will depend on whether the vertices of the primitives to be rendered have a sufficient number of common vertices in neighboring primitives. Referring to FIG. 6D, the same original graphics primitive call sequence 650 is reduced to a triangle strip. The optimized graphics primitive call sequence 664 contains 8 graphics calls 666A–666F that provides for the same rendering on a graphics system 100 as would have been achieved by implementing the original graphics call sequence 660 or the optimized graphics primitive call sequence 654.

In order for the original graphics primitive call sequence 650 to be converted to a graphics primitive call of type GL_TRIANGLE_STRIP, at least two vertices of each triangle must be the same as two vertices of the neighboring triangle(s). If so, then the redundant graphics vertex calls are removed from the optimized graphics primitive call sequence 664 at block 612. As with the optimized graphics primitive call sequence 654, only one glBegin( )/glEnd( ) pair appears in the optimized graphics primitive call sequence 664. This reduction in glBegin( )/glEnd( ) pairs, as stated above, reduces the overhead associated with such pairs. Notice also, that the glBegin( ) graphics call 666A specific a GL_TRIANGLE_STRIP instead of GL_TRIANGLES primitive type. In addition, rendering a strip type graphics primitive also reduces the total number of graphics vertex calls and, therefore, the total number of vertices rendered by the graphics system 100.

It should be understood that either one of the above processes may be performed independently or together, depending upon the desired application. Should the latter procedure be performed alone or before the initial procedure, then at block 612 the removal would also include removing the glBegin( ) and glEnd( ) calls except those at the beginning and the end of the sequence, as described above. While the particular exemplary reduction illustrated above may appear minimal, it should be understood that a common graphics primitive call sequence of millions or more graphics primitive calls could achieve significant reductions.

Figure 6E:
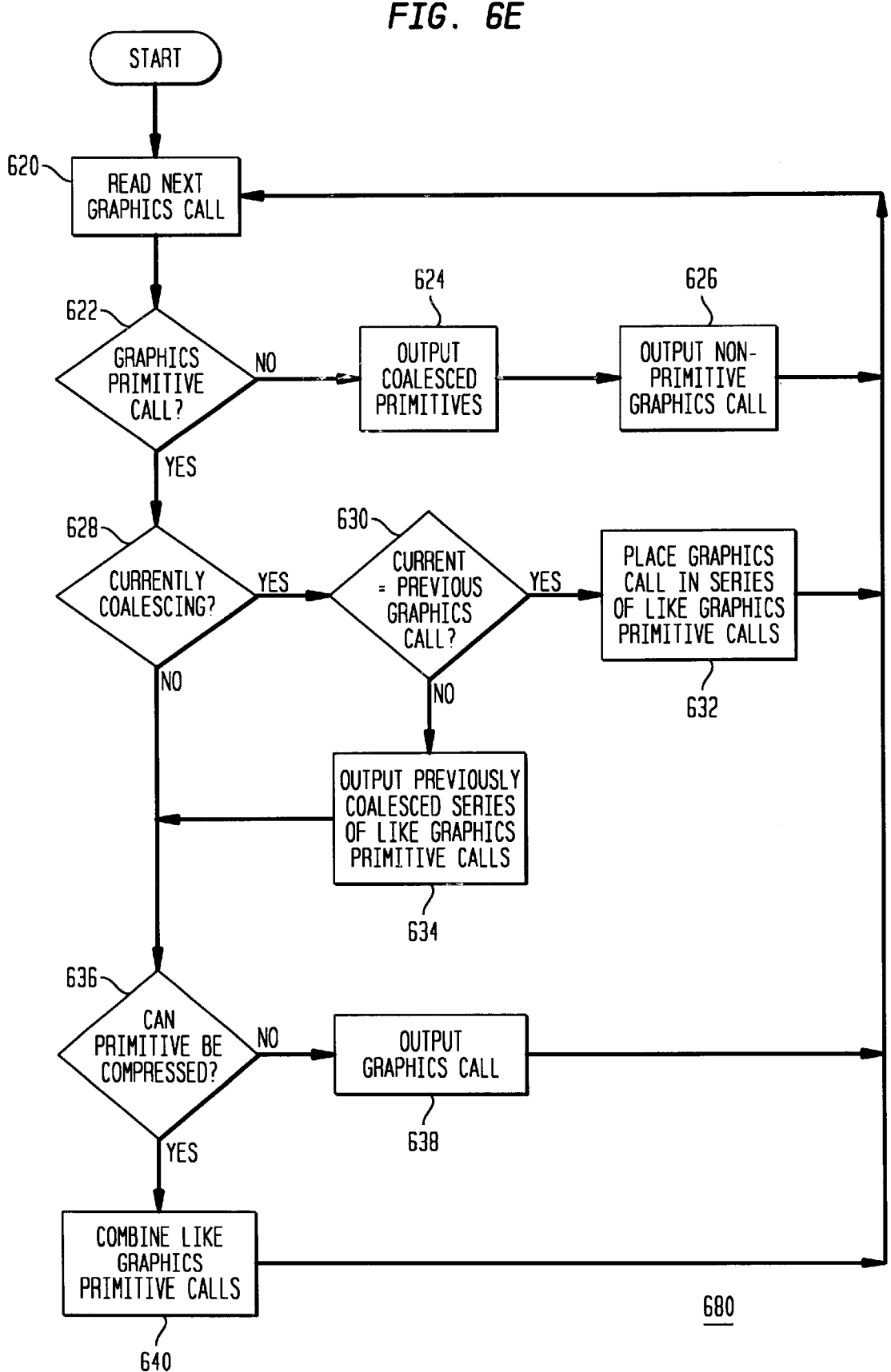
FIG. 6E is a detailed flowchart of one embodiment of the implementation of the primitive coalescing process of the present invention.

FIG. 6E is a detailed flow chart of one embodiment of a primitive coalescing process 680 that may be implemented in the exemplary graphics environment illustrated in FIG. 1 and described above. At block 620 each graphics call of the captured graphics call sequence 312 is retrieved. At block 622 each graphics call is analyzed to determine whether it is a graphics primitive call. If the graphics call is not a graphics primitive call, primitives that have been coalesced thus far, if any, are output at block 624. The non-primitive graphics call is then output at block 626. Processing is then repeated until, at block 622, a graphics primitive call is identified.

As noted, graphics calls may be of three types, graphics primitive calls, graphics frame calls, and graphics state calls. The effect of graphics state calls in this embodiment is the same as previously defined. Graphics frame calls cause the graphics system to render any primitives and then the screen is cleared and the next image is created. Thus, if the non-primitives graphics call to be output at block 626 is a graphics frame call, the optimized graphics primitive sequence 654 will include the graphics frame call that causes the graphics system 100 to render all primitives and advance to the next image.

If the graphics call is determined to be a graphics primitive call, then at block 628 it is determined whether the graphics primitive coalscer 408 is currently coalescing a primitive at block 628. If so, then at block 630, the coalescer 408 determines whether the current graphics primitive call is of the same type as the previous graphics primitive call. This determination will ensure that only a series of graphics primitive calls that specify the same primitive type will be coalesced together. If the current graphics primitive call and the primitive currently being coalesced are of the same type, the current graphics primitive call is placed into a series of like graphics primitive calls at block 632. Otherwise, the previously coalesced series of graphics primitive calls is output at block 634. Since the process 680 has previously been determined that the present call is a graphics primitive call at block 622, and that the present graphics primitive call is not of the same primitive type that is being currently coalesced, at block 634, generation of the previously coalesced primitives enables the graphics primitive coalescer 408 to begin combining a new series of like graphics primitive calls.

At block 636 a determination is made as to whether the graphics primitive call is of a type that can be coalesced. Certain API's have limitations on which types of graphics primitive calls may be combined. For example, in the OpenGL API, polygons cannot be coalesced as described above since the graphics system requires the presence of the glEnd( ) graphics primitive call to identify the last vertex of a multi-vertex polygon. Also, primitive strips cannot be coalesced as described above for similar reasons. If the graphics primitive call identifies such a primitive type, then the current graphics primitive call is output at block 638 and processing is repeated. Otherwise, at block 640 the accumulation of continuously received graphics primitive calls occurs.

Figure 7A:
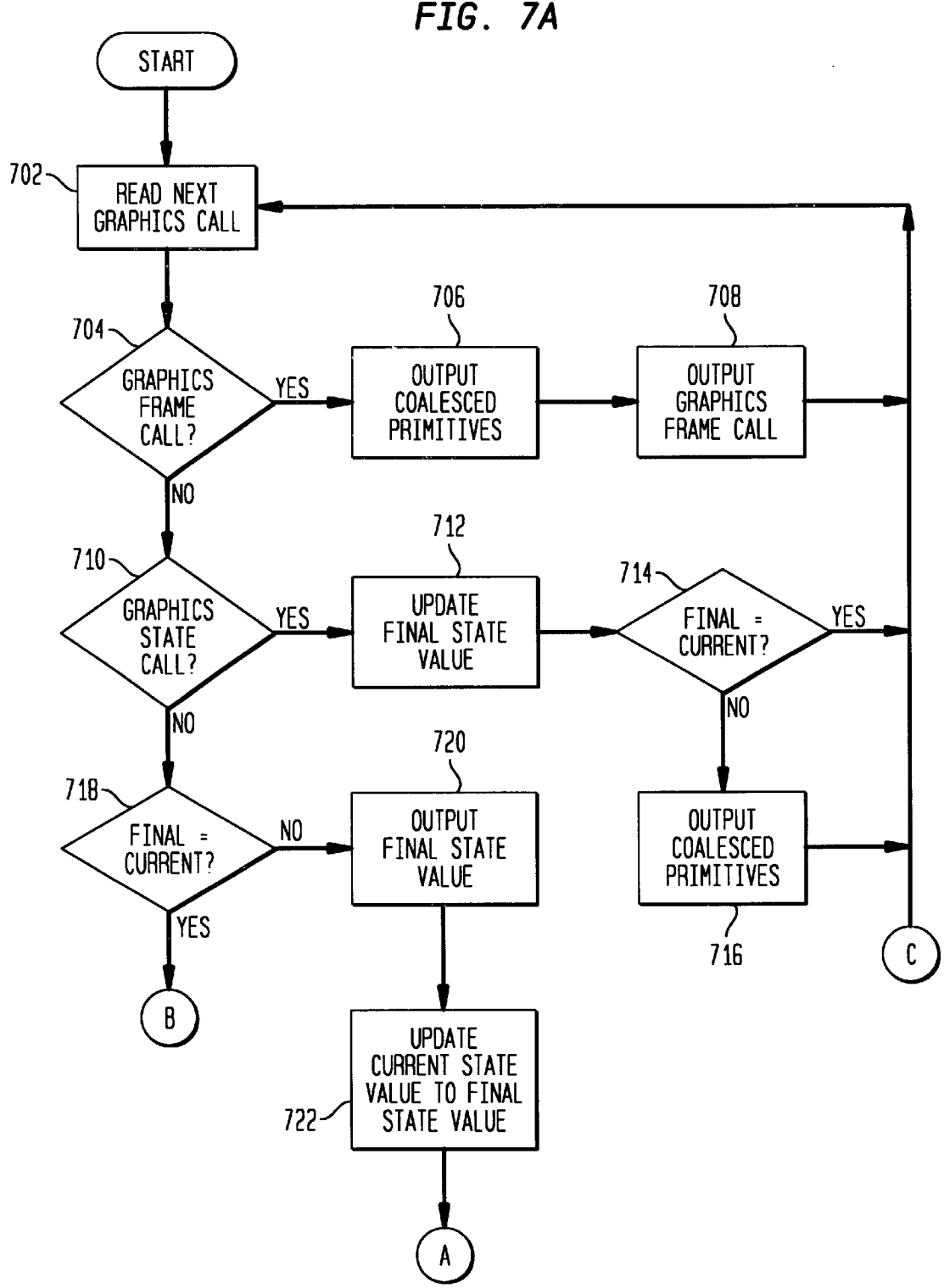
FIGS. 7A and 7B are a detailed flowchart of one embodiment of the implementation of the state and primitive coalescing processes of the present invention.
Figure 7B:
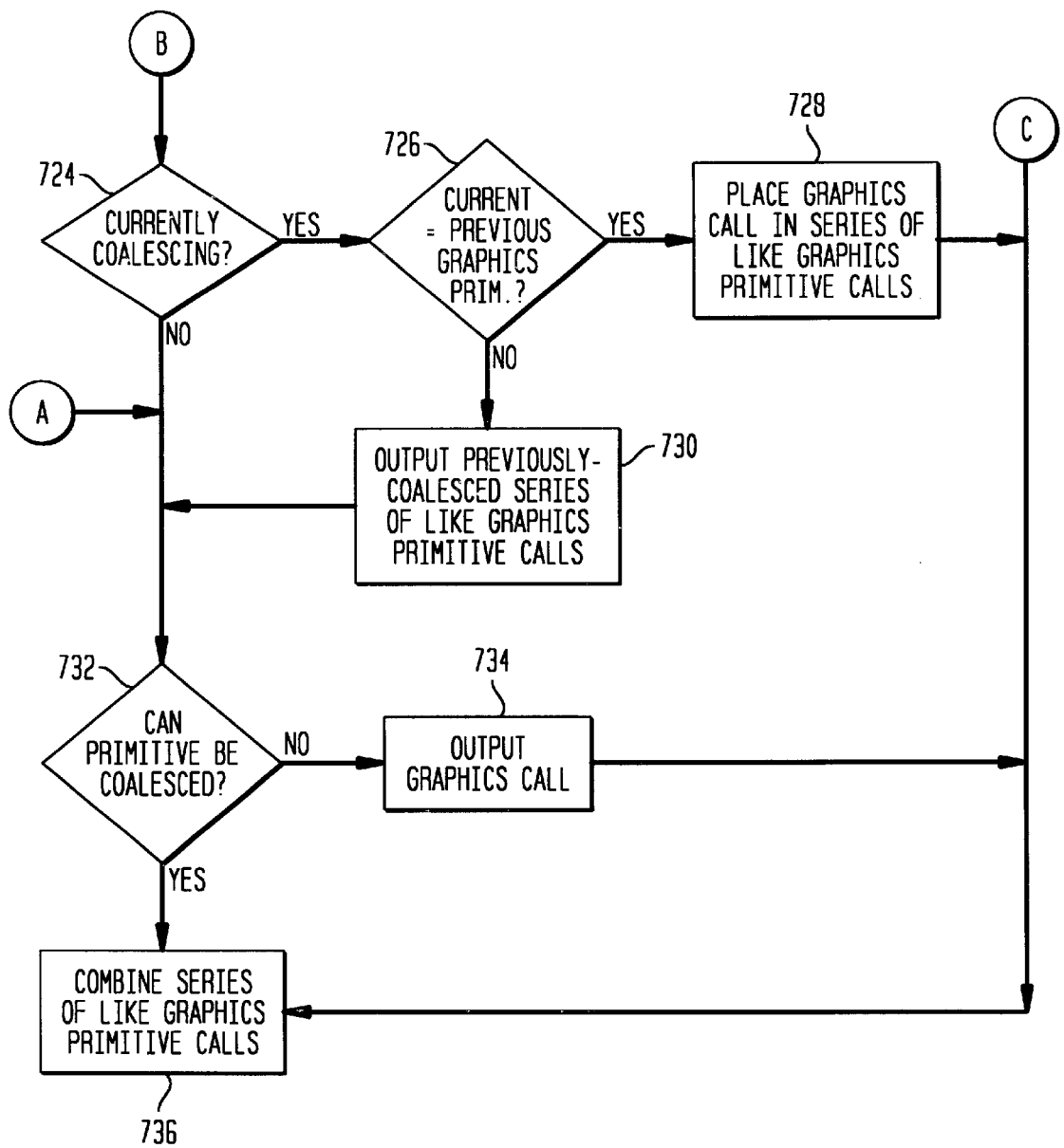

As noted above, the graphics state coalescing process and the graphics primitive coalescing processes can be combined into a single process in alternative embodiments. FIGS. 7A and 7B are a detailed flow chart of one implementation of such a combined coalescing process. At block 702 each graphics call from the captured graphics call sequence 312 is individually introduced to the combined coalescing optimization process. At block 704 each graphics call is analyzed to determine whether this graphics call is a graphics frame call. If the graphics call is a graphics frame call, then the coalesced primitives, if any, are output at block 706 and the graphics frame call is output at block 708.

If at block 704 it is determined that the graphics call is not a graphics frame call then processing continues at block 710 whereat it is determined whether the graphics call is a graphics state call. If so, then the final state value is updated at block 712. At block 714 it is determined whether the final state value is the same as the current state value. If it is, no action is taken and processing is repeated at block 702. If the final state is different than the current state, then the coalesced primitives, if any, are output at block 716.

When the current graphics call is not a graphics state call, processing continues at block 718. Here, it is determined whether the final state value is the same as the current state value. If not, the final state value is output at block 720 and the current state value is updated to the final state value at block 722. However, if the current state value does equal the final state value, then, at block 724, the process determines whether a primitive is currently being coalesced. If so, then processing continues at block 726 whereat it is determined whether the current graphics primitive call is of the same type of as the primitive currently being coalesced. If they are of the same type, the graphics call is placed, at block 728, into a series of like graphics primitive calls. If the current graphics primitive call is not of the same type as the previous graphics primitive call, the previously coalesced series of like graphics primitive calls is output at block 730.

The processing continues a block 732 after determination of whether a graphics primitive is currently being coalesced, or after the current state value has been updated to the final state value, or after the previously coalesced series of like graphics primitive calls has been output. At block 732 it is determined whether the current graphics call is of a type that can be coalesced. If it is not, the graphics call is output at block 734. Otherwise, the series of like graphics primitive calls are combined at block 736.

F. Common State Primitive Command Set Compilation Processes

Figure 8A:
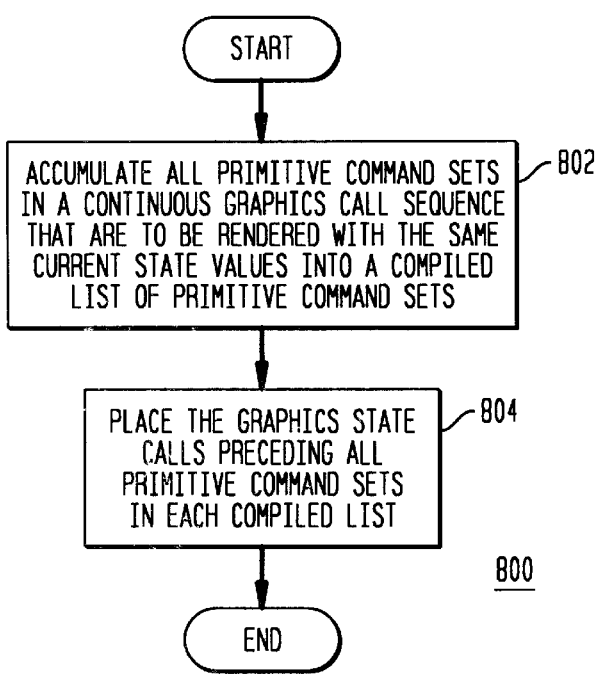
FIG. 8A is a high level flowchart of one embodiment of the common state primitive command set compilation process of the present invention.

FIG. 8A is high level flow diagram of one embodiment of the common state primitive command set compilation process 800 performed in accordance with the present invention. The compilation process 800 remedies frequent toggling of state values by the graphics application 302 which cause duplicative graphics state calls being implemented by the graphics system 100. The common state primitive compilation process 800 reduces the state changes invoked in the graphics system 100 by compiling a continuous series of primitive command sets that are to be rendered with the same state values. All primitive command sets in a continuous graphics call sequence 312 occurring between graphics state calls are compiled. The compiled list is preceded by the graphics state calls necessary to establish the common state values in which the primitive command sets are to be rendered. At block 802 the primitive command sets are compiled based upon the graphics state calls that immediately precede them. A particular state may be changed any number of time in such preceding series, with only the active states being considered for the grouping. Thus, only the graphics state calls necessary for rendering the specific compiled list of primitive command sets are associated with the resulting compilation. Once the primitive command sets have been compiled, then at block 804 the graphics state calls associated with each compilation is written to the optimized graphics call sequence, followed by the associated compilation of primitive command sets.

Figure 8B:
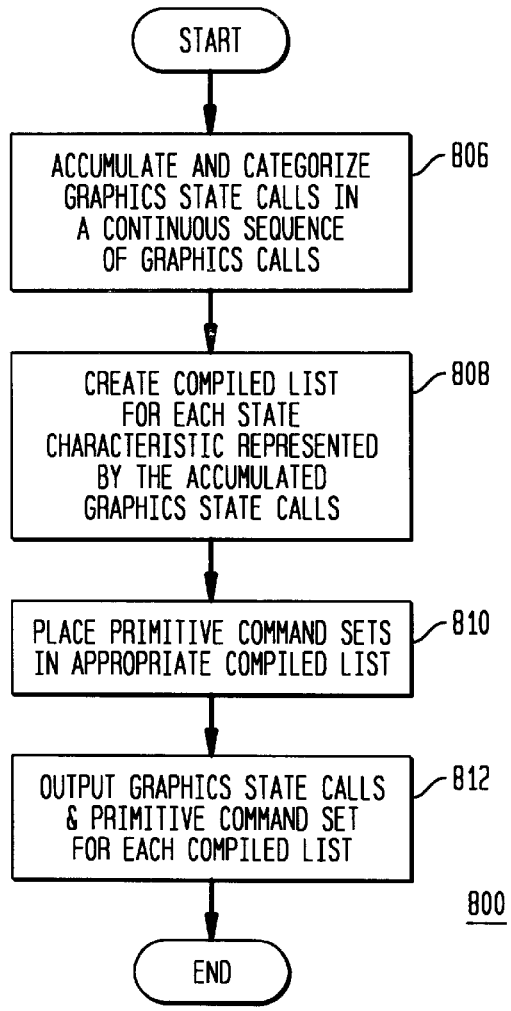
FIG. 8B is a low level flowchart of one embodiment of the common state primitive command set compilation process of the present invention.

A more detailed flow chart of the common state primitive command set compilation process 800 is shown in FIG. 8B. This process will be described with reference to exemplary original and optimized graphics call sequences 850 and 854 shown in FIG. 8C. In FIG. 8C an original graphics call sequence 850 contains 22 graphics calls 852A–852V, of which 4 are graphics state calls (852A, 852G, 852L and 852R) and the remaining graphics calls are graphics primitives calls. The graphics primitive calls comprise 4 primitive command sets 860A–860D, with primitive command sets 860A and 860C being rendered with the GL_LIGHTING state enabled, and the primitive command sets 860B and 860D rendered with the GL_LIGHTING state disabled.

At block 806, the graphics state calls are accumulated until there is a graphics call in the captured sequence 312 indicating that the graphics state values are to be applied to the primitives. As noted, in the exemplary embodiment, this is another primitive command set or a graphics frame call, although other graphics calls may qualify in other embodiments. Referring to FIG. 8C, 4 such graphics calls 852A, 852G, 852L, 852R occurred in the sequence 850.

At block 808, an allocation for each of the graphics state calls is created based upon the accumulated graphics state calls. This may be created in a variety of ways. For example, memory locations may be allocated with the first region containing the accumulated graphics state calls or state values. Such accumulated graphics state values will herein be referred to as the state characteristic of the compiled primitive command sets. Referring to FIG. 8C, two compiled lists are created from the original graphics call sequence 850. These two compiled lists are associated with the state characteristic of glEnable(GL_LIGHTING), resulting from the graphics state calls 852A and 852L; and the state characteristic glDisable(GL_LIGHTING), resulting from the graphics state calls 852G and 852R.

Each primitive command set is placed, at block 810, into the compiled list having the same state characteristic. Because a compiled list is created for every graphics call characteristic encountered in the original graphics call sequence 850, every primitive command set will have a compiled list into which it may be placed. Referring to FIG. 8C, two primitive command sets 860A and 860C would both be placed in the same compiled list because they both have a graphics state call characteristic consisting of the graphics state call glEnable(GL_LIGHTING). The other two primitive command sets 860B and 860D are placed in the compiled list having a call characteristic of glDisable(GL_LIGHTING).

Accordingly, at block 812, the optimized command set 854 is created with graphics state calls for only 2 graphics state call characteristics: graphics state call glEnable(GL_LIGHTING) 858A and graphics state call glDisable(GL_LIGHTING) 858B. Each is followed by the primitive command sets compiled for that state characteristic. Referring to FIG. 8C, after the graphics state call glEnable(GL_LIGHTING) 858A the primitive command sets 856A and 856B are provided corresponding to 860A and 860C, respectively. Likewise, after the graphics state call glDisable(GL_LIGHTING) 858B the primitive command sets 856C and 856B are provided corresponding to 860B and 860D, respectively.

Thus, the graphics primitive calls that were associated in the original graphics call sequence 850 with state characteristic are now all contained in a single sequence following the appropriate graphics state call that establishes the appropriate state characteristics. The number of graphics state calls and the overhead associated with the toggling of such graphics state calls is thereby reduced.

Figure 8D:
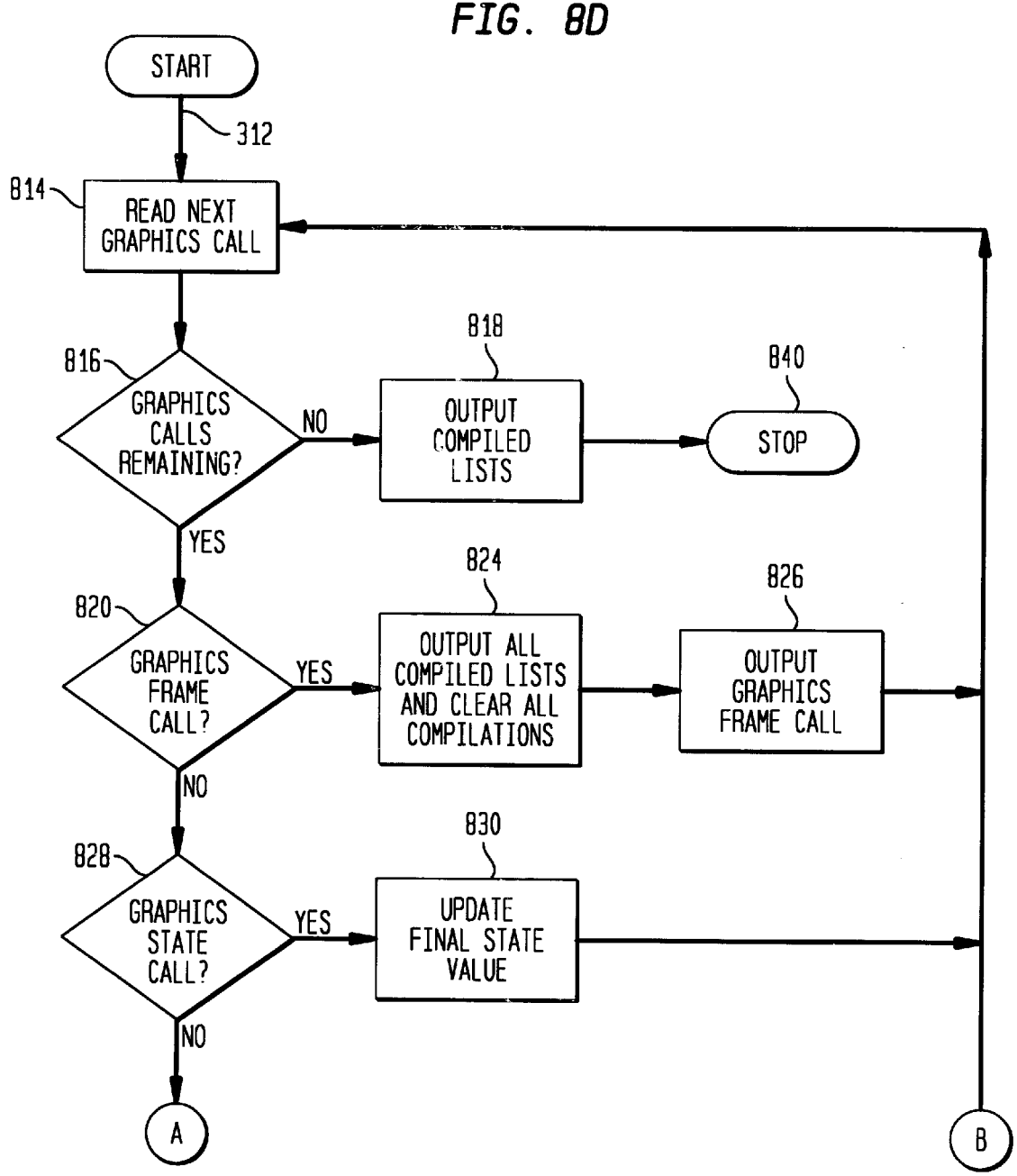
FIGS. 8D–8E are a detailed flowchart of one embodiment of the implementation of the common state primitive command set compilation process of the present invention.
Figure 8E:
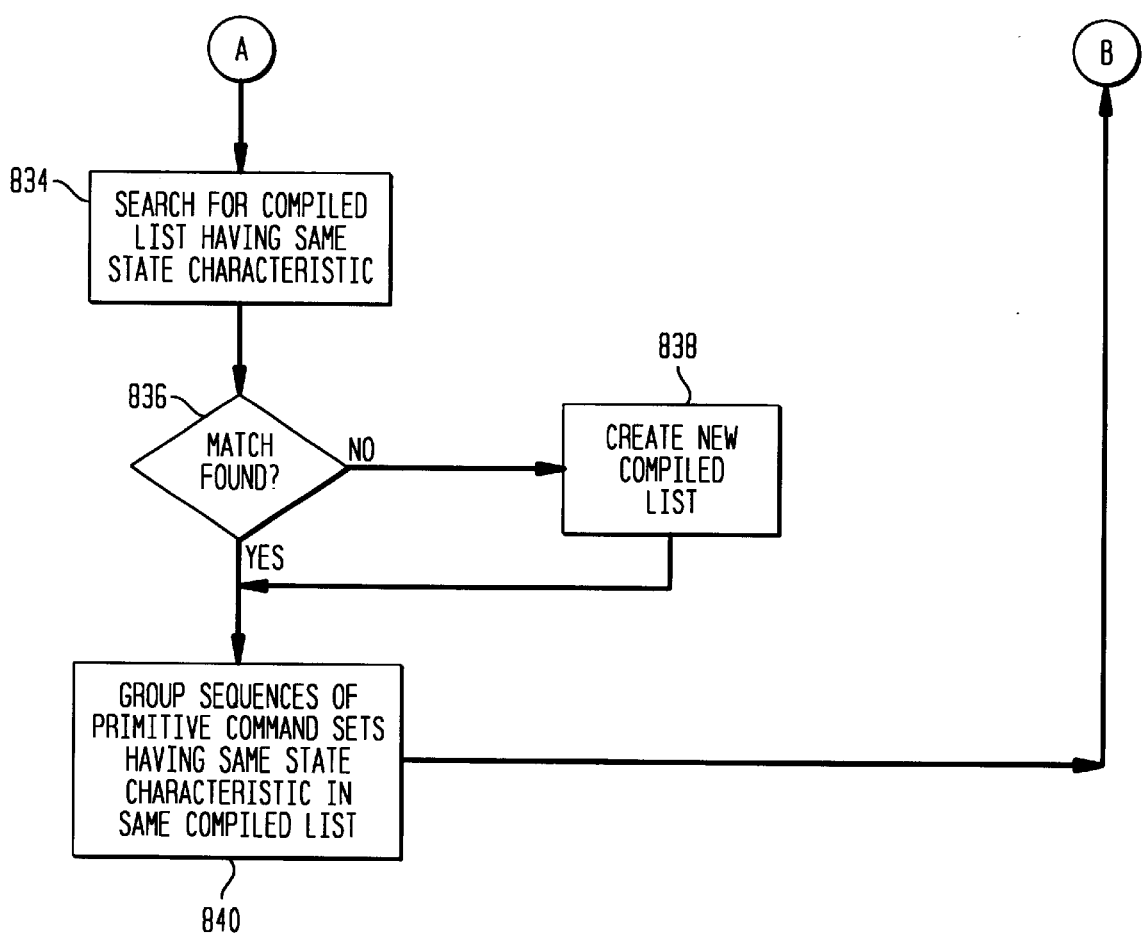

FIGS. 8D and 8E are a detailed flow chart of one implementation of a primitive command set compilation process 880 that may be applied to the exemplary graphics system 100 illustrated in FIG. 1. At block 814 each graphics call from the captured graphics call sequence 312 is individually introduced to the optimization process. At block 816 it is determined whether there are graphics calls remaining in the captured sequence 312. If there are no additional graphics calls, all of the compiled lists are output at block 818 and the process completes at block 840. If additional graphics calls exist then, at block 820A the graphics call is analyzed to determine whether it is a graphics frame call. If the graphics call is a graphics frame call, all compiled lists are output and cleared at block 824. Then, at block 826, the graphics frame call itself is output. If at block 820 it is determined that the graphics call is not a graphics frame call, then processing advances to block 828. At block 828 it is determined at whether the graphics call is graphics state call. If it is, the final state value for the specified graphics state is updated at block 830.

If at block 828 it is determined that the graphics call is not a graphics state call, then the graphics call is a graphics primitive call. A search is then conducted at block 834 to locate a compiled lists that has the same state characteristics as the current graphics primitive call. If such a compiled list exists, then the graphics primitive call is placed into that compiled list at block 840. Otherwise, a compiled list for graphics primitive calls having a state characteristic that matches the current graphics primitive call is created at block 838. Block 840 is then performed to place the current graphics primitive call in the newly created compiled list.

G. Primitive Type Converter Processes

FIG. 9A is a high level flow diagram of one embodiment of the primitive type converter process 900. This flow chart will be describe with reference to exemplary original and optimized graphics call sequences shown 950, 980 in FIG. 9B. The primitive type conversion process 900 converts the primitive type specified in a graphics call sequence 312 from a non-combinable primitive type to combinable primitive type. As noted, non-combinable primitive types are those primitives that cannot be coalesced by the graphics primitive state coalescer 408. The specified primitive types which are non-combinable are a function of the implemented graphics interface. For OpenGL API, the group of non-combinable graphics primitives types include line strips, triangle strips, quadrilateral strips, triangle fans, line loops and polygon primitive types. Primitive command sets specifying these primitives having the above-noted number of graphics vertex calls may be converted to the specified combinable graphics primitive type.

At block 902 a determination is made as to whether the primitive command set specifies a non-combinable primitive type. The qualifying primitive types for OpenGL API are given above. Referring to FIG. 9B, the original graphics call sequence 950 contains 2 non-combinable primitive command sets: primitive command set 952A specifying a polygon primitive type with 3 graphics vertex calls 954A–C, and a primitive command set 952B specifying a line strip primitive type with 2 graphics vertex calls 956A–B.

At block 904 a determination is made as to the appropriate combinable primitive type to which this non-combinable primitive type should be converted. Referring to FIG. 9B, the polygon primitive type having 3 vertices 954A–954C in the original graphics call sequence 950 will be converted to a triangle primitive type. Further, the line strip primitive type having only two vertices 956A–956B in the original graphics calls sequence 950 will be converted to a line primitive type.

At block 906 the primitive command sets are modified accordingly. Implementation of the primitive type conversion involves replacing the non-combinable graphics primitive type with the combinable equivalent in the glBegin( ) graphics call. Referring to FIG. 9B, the GL__POLYGON in the brackets of the glBegin( ) 958A of the primitive command set 952A is replaced in the optimized command set 954 with GL__TRIANGLES as shown by the glBegin( ) graphics call 960A. The three vertices 954 are carried over to the optimized primitive command set 962A as shown by vertices 964A–C. The GL__LINE__STRIP in the brackets of the glBegin( ) 958B of the primitive command set 952B is replaced in the optimized command set 980 with GL__LINE as shown by the glBegin( ) graphics call 960B. The two vertices 956 are carried over to the optimized primitive command set 962B as shown by vertices 966A–B.

Figure 9C:
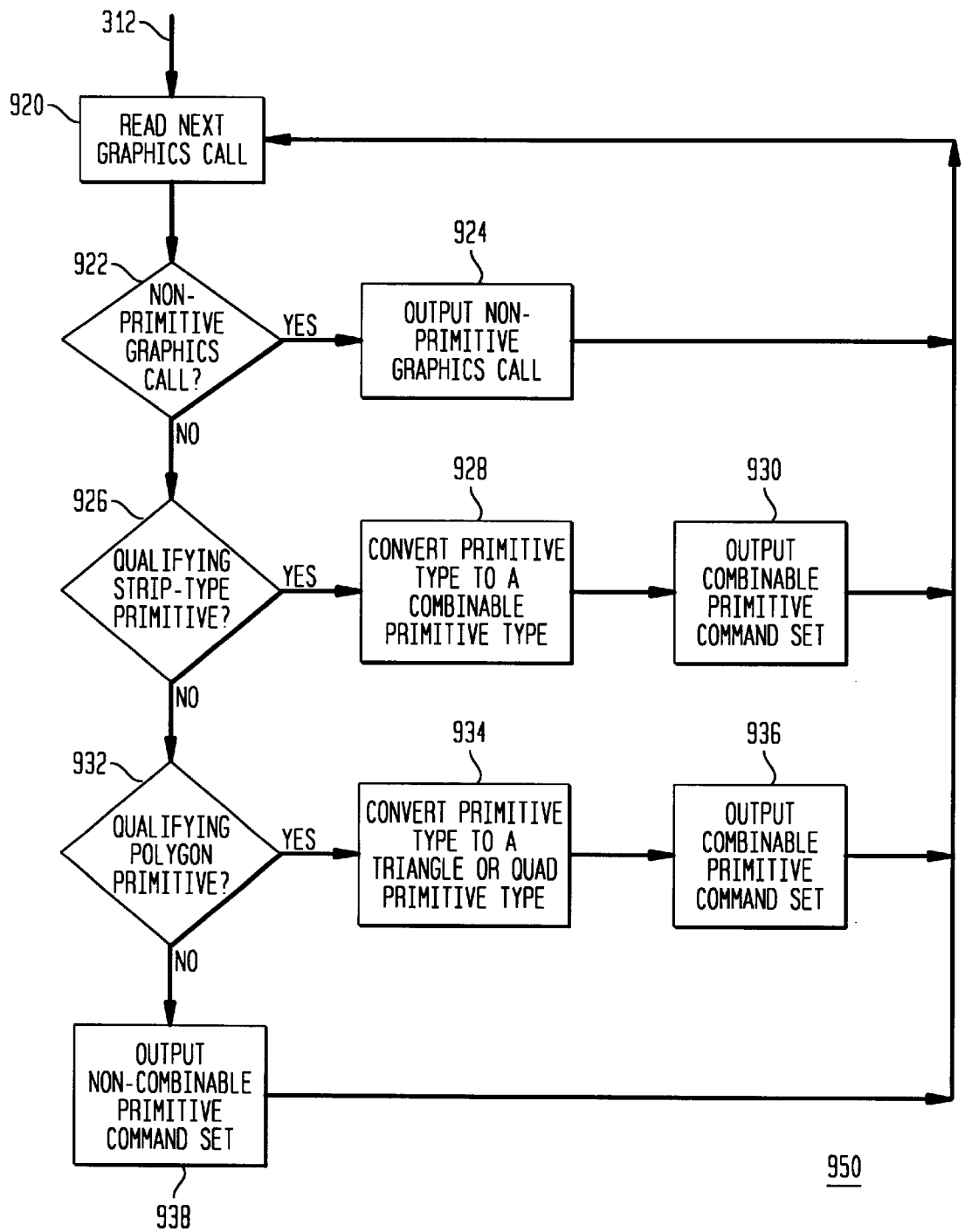
FIGS. 9C is a detailed flowchart of one embodiment of the implementation of the primitive type conversion process of the present invention.

FIG. 9C is a detailed flow chart of one implementation of a primitive type conversion process 950 that may be applied to the exemplary graphics system illustrated in FIG. 1 implementing an OpenGL API. At block 920 each graphics call from the captured sequence 312 is individually introduced to the primitive type conversion process. At block 922 it is determined whether the current graphics call is a non-primitive graphics call. If the graphics call is a non-primitive graphics primitive call, then the graphics call is output at block 924. Otherwise, processing continues at block 926. At block 926 the graphics call is analyzed to determine whether it is a glBegin( ) graphics call specifying a strip-type primitive. As noted, strip-type primitives are not combinable using OpenGL. If not, a similar process is performed at block 932 with respect to polygon primitive type.

If the graphics call is a glBegin( ) graphics call specifying a qualifying strip-type primitive type or polygon primitive type, then the primitive type of the primitive command set is converted to an appropriate primitive type at blocks 928 and 934, respectively. After the primitive type is converted, the primitive command set is output to the optimized graphics call sequence at blocks 930 and 936, respectively.

If it was determined that the graphics call does not specify a non-combinable primitive type then the graphics call is not non-combinable and does not qualify for this optimization process. Accordingly, the graphics call is output at block 938.

H. Vertex Array Builder Processes

Figure 10A:
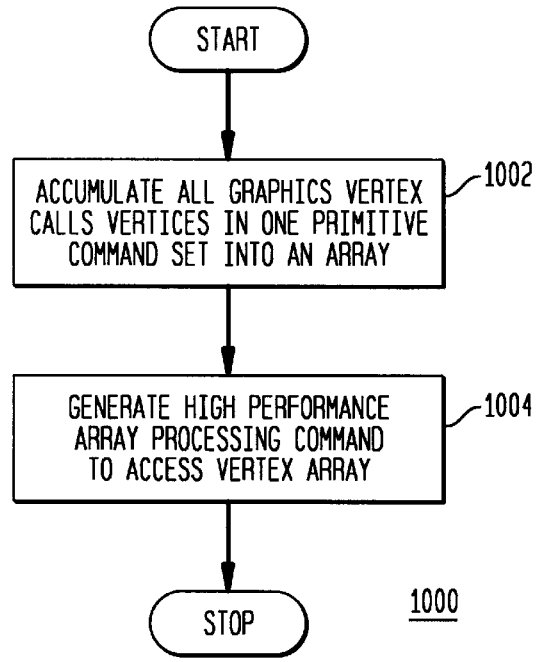
FIG. 10A is a high level flowchart of one embodiment of the vertex array generation process of the present invention.

FIG. 10A is a high level flow diagram of one embodiment of the vertex array generation process 1000 performed in accordance with the present invention. The vertex array generation process 1000 creates a vertex array having vertices identified in a series of graphics vertex calls of a primitive command set, and generates the associated pointer and graphics array call referencing the pointer for using the array vertices to render a number of specified primitives.

At block 1002 the vertices specified in all graphics vertex calls occurring in one primitive command set are accumulated into locations in memory as an array for reference by a high-performance array processing graphics call. The array contains a series of vertex data as specified in the OpenGL API. Once the vertex data has been accumulated in the vertex array, a pointer to the array and an appropriate graphics array call that accesses the vertex array is generated at block 1004.

As one skilled in the art would find apparent, other types of arrays supported by the graphics interface may be implemented in accordance with this embodiment of the present invention. For example, the OpenGL API supports arrays that are accessed by glColorPointer( ), glIndexPointer( ), glNormalPointer( ), glTexCoordPointer( ) and glEdgeFlagPointer( ).

Figure 10B:
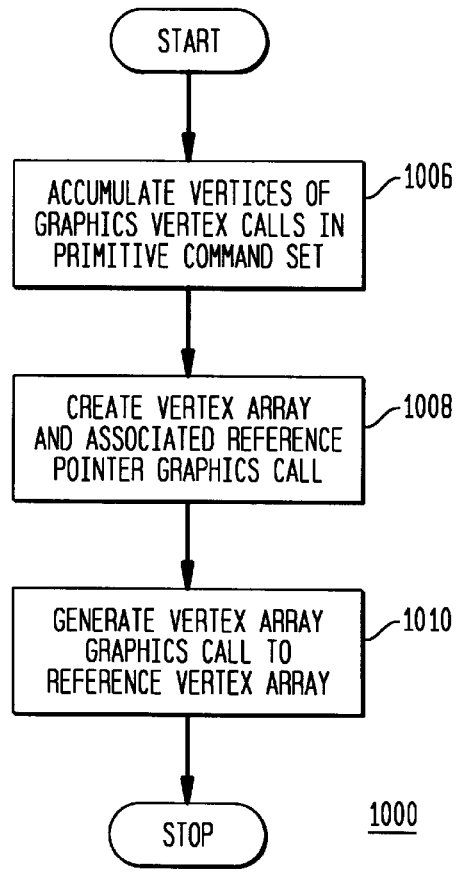
FIG. 10B is a low level flowchart of one embodiment of the vertex array generation process of the present invention.
Figure 10C:
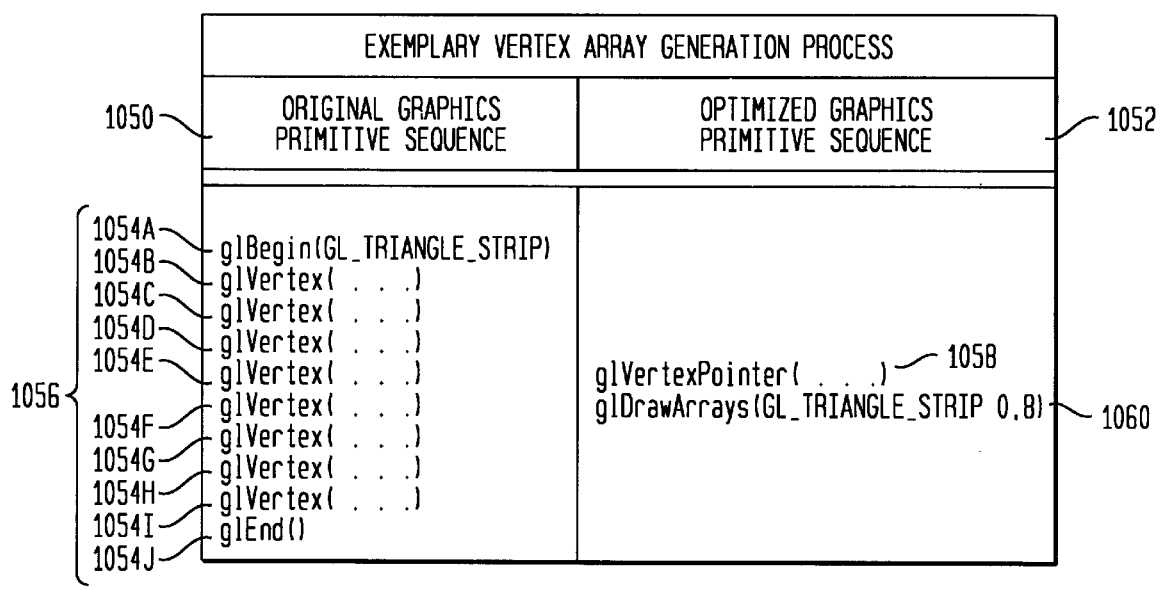
FIG. 10C is a table illustrating an exemplary vertex array generation process in accordance with one embodiment of the present invention.

A more detailed flow chart of one embodiment of the vertex array generation process 1000 of the present invention is shown in FIG. 10B. This process will be described with reference to exemplary original and optimized graphics call sequences 1050, 1052 shown in FIG. 10C. In FIG. 10C an original graphics call sequence 1050 contains 10 graphics primitive calls 1054A–1054J which constitute one primitive command set identifying a triangle strip primitive having 6 triangles drawn between 8 vertices. An optimized command set 1054 generated in accordance with the present invention contains 2 graphics vertex-array primitive calls 1056A–1056B providing for the rendering of the same triangle strip display on a graphics system as would have been achieved by implementing the original graphics call sequence 1050.

At block 1006, a series of vertex locations used to render a graphics primitive are accumulated. For example, in an OpenGL API a primitive is defined by the graphics vertex calls occurring between a glBegin( )/glEnd( ) pair.

At block 1008, the accumulated vertex locations are placed into an array. The beginning of the array is identified by a glVertexPointer(. . .) call, where the location denoting the start of the array is contained in the brackets. Referring to FIG. 10C, 8 vertex locations 1052B–1052I exist in the original graphics call sequence 1050. These 8 vertex locations are be placed in an array, the start of which is recorded in the brackets of the glVertexPointer (. . .) call 1058 of the optimized graphics call sequence 1052.

At block 1010, a high-performance graphics call that will access the array is generated that will cause a rendering by the graphics system of a graphics primitive having its vertices located at the locations stored in the array. Referring to the FIG. 10C, the high performance graphics call glDrawArrays 1060 is contained in the optimized graphics call sequence 1052. The high-performance graphics call 1060 contains argument identifying the type of primitive to be rendered and the vertices in the array to be used in such rendering. Referring to FIG. 10C, the glDrawArrays graphics call argument contains the argument (GL_TRIANGLE_STRIP, 0, 8). The GL_TRIANGLE_STRIP argument tells the high performance command to draw a triangle strip. This information comes from the graphics primitive call glBegin(GL_TRIANGLE_STRIP) 1052A contained in the original graphics call sequence 1050. Required by the glDrawArrays graphics call is the set up of the vertex array before the glDrawArrays graphics call is issued. This array is specified by the glVertexPointer( ) call 1058 in the optimized graphics primitive sequence 1052. The "0" identifies for the graphics system that it is to look for vertex locations at the beginning of the array and the "8" tells the command to take a series of 8 vertex locations (positions 0–7) from the array. The 8 vertex locations 1054B–1054I in the original graphics call sequence have been placed into the array at step 1008 so these are the vertex locations that will be used by the high-performance command. Thus, generation of such high-performance commands will result in a rendering by the graphics system 100 that is the same as would have been rendered by the original graphics call sequence 1050.

Figure 10D:
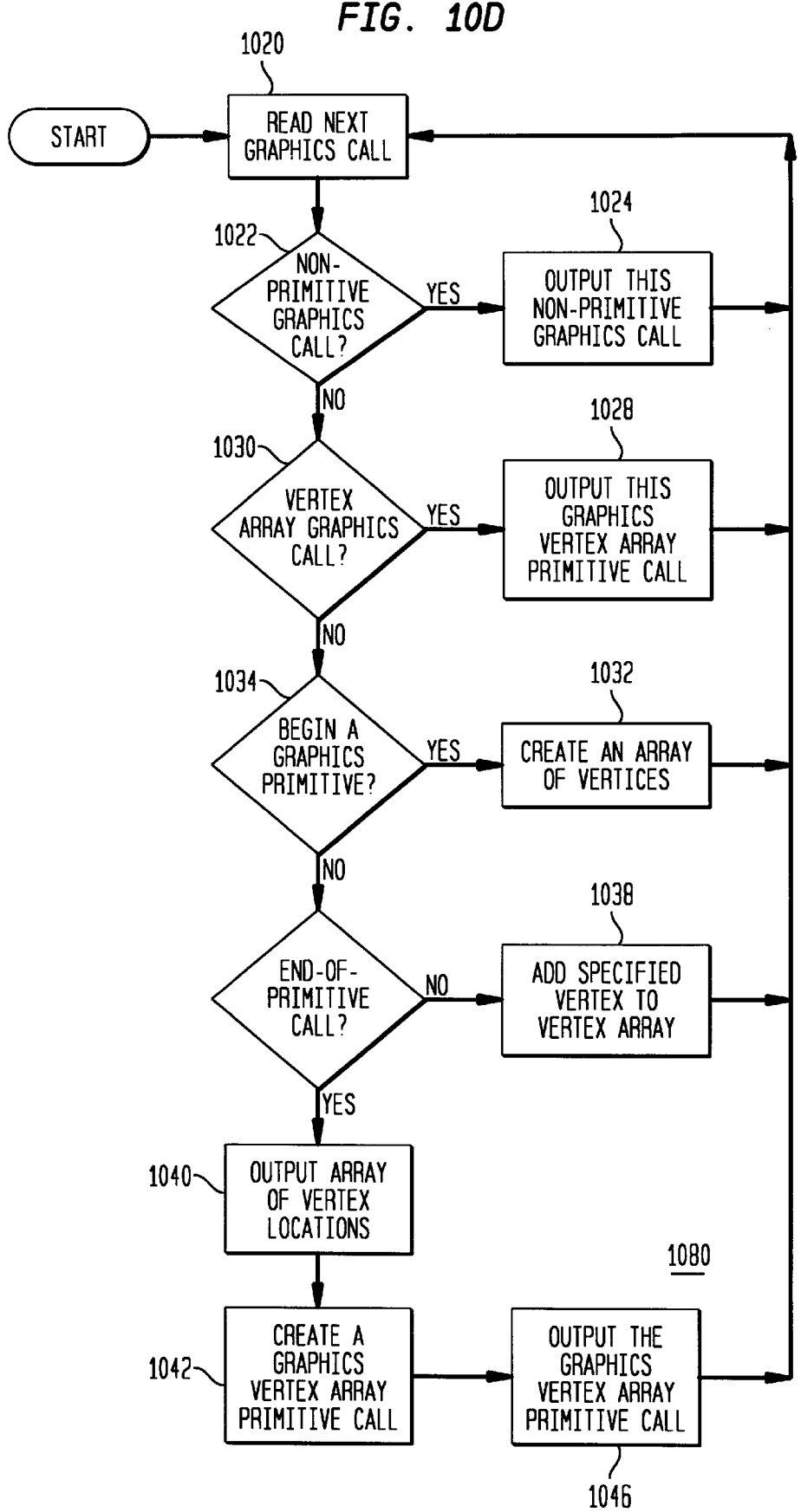
FIG. 10D is a detailed flowchart of one embodiment of the implementation of the primitive type conversion process of the present invention.

FIG. 10D is a detailed flow chart of one implementation of the vertex array builder process 1080 that may be applied to the exemplary graphics system illustrated in FIG. 1. At block 1020 each graphics call from the captured graphics call sequence 312 is retrieved. At block 1022 the graphics call is analyzed to determine whether or not it is a graphics primitive call. If it is not, the graphics call is output at block 1024. However, if the graphics call is a graphics primitive call then, at block 1030, a determination as to whether this graphics call is a graphics vertex-array primitive is performed. If the graphics call is a graphics vertex-array primitive call, this optimization is not necessary and the graphics vertex-array primitive call is output at block 1028.

If the graphics call is not a graphics vertex-array primitive call, processing continues at block 1034 wherein a determination is made as to whether graphics call is the beginning of a graphics primitive, such as a glBegin(GL_TRIANGLE_STRIP) call. If it is such a graphics call, an array is created at block 1032 for storing the series of graphics vertex calls following the graphics primitive calls.

If the graphics call is not the beginning of a graphics primitive call, it is then determined at block 1035 whether this graphics call is an end-of-primitive graphics call, such as glEnd( ). If this is not, at block 1038 the graphics call is added to the array of vertex locations if the two states match.

At block 1040 the array of vertex locations is output when the graphics call is an end-of-primitive call. A graphics vertex-array primitive call that references the array of vertex locations is then created at block 1042. The type of vertex-array primitive to be created is specified between the brackets of the glBegin( ) that immediately preceded the series of graphics vertex calls.

I. Vertex Loop-Rolling Processes

FIG. 11A is a high level flow diagram of one embodiment of the loop-rolling process 1100 performed in accordance with the present invention. The vertex loop generation process 1100 is applied to any repetitive series of graphics calls occurring in a primitive command set. A repeatable loop to efficiently process repetitive series of graphics calls is generated, converting graphics calls occurring in a primitive command set into a form that yields performance results similar to the graphics application.

The flow chart of FIG. 11A will now be described with reference to exemplary original and optimized graphics call sequences shown in FIG. 11B. In FIG. 11B an original graphics call sequence 1150 contains 8 graphics primitive calls 1152A–1152H. An optimized command set 1154 generated by the present invention contains one graphics primitive glBegin( )/glEnd( ) pair 1156A, 1156E between which are 3 graphics calls that repetitively generate 2 graphics call 1156C, 1156D 3 times. This provides for the same rendering on a graphics system as would have been achieved by implementing the original graphics call sequence 1150.

At block 1102 the graphics calls that comprise a repetitive series are identified. The repetitive series may be determined in real time or may be selected from a set of pre-determined repetitive series which the process recognizes. Referring to FIG. 11B, the repetitive series glNormal( ), glVertex( ), exists in the original graphics call sequence 1150 at 1152B–1152C, 1152D–1152E, and 1152F–1152G. This repetitive series could be longer but is shown in FIG. 11B as having only two graphics calls for simplicity.

Once a repetitive series has been identified, the number of times it continuously appears in the primitive command set is counted at block 1104. This count is used at block 1106 to generate an optimized graphics call sequence effecting a loop execution of the repetitive graphics calls for the identified number of times the particular repetitive pattern should be implemented. Referring to FIG. 11B, the count in the graphics call sequence 1156B is used to inform the computing system how many times the particular graphics call sequence should be implemented. The repetitive series glNormal( ), glVertex( ) exist in the original graphics call sequence 1150 three times. In the optimized graphics call sequence 1154, the graphics system is instructed to implement the repetitive series 3 times. This is achieved by using a "for (i=0; i<3; i++)" graphics call 1156B which causes the graphics system 100 to repeat the glNormal( ), glVertex( ) repetitive series 3 times. One way to ensure that the correct vertex locations are rendered by the graphics system 100 is to have the repetitive series, glNormal( ), glVertex( ) data or arguments stored in an array. The array is accessed on each pass of the "for-loop" to retrieve data for the next set of glNormal, glVertex calls.

Figure 11C:
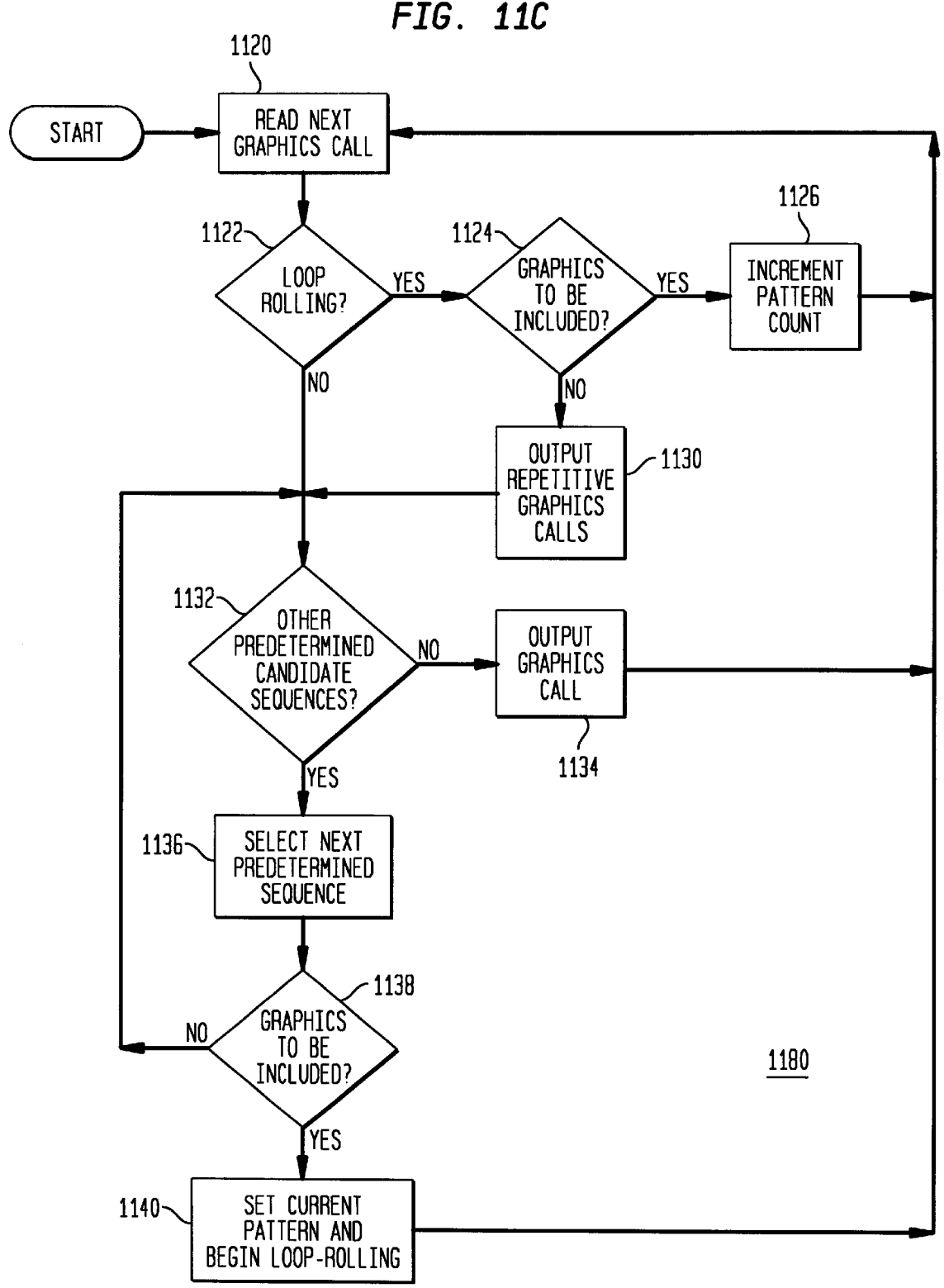
FIG. 11C is a detailed flowchart of one embodiment of the vertex loop rolling process of the present invention.

FIG. 11C is a detailed flow chart of one implementation of a vertex loop-rolling process 1180 that may be applied to the exemplary graphics system 100 illustrated in FIG. 1. At block 1120 each graphics call from the captured graphics call sequence 312 is retrieved. At block 1122 the graphics call is analyzed to determine whether the process is currently loop-rolling a repetitive series of graphics calls. If a series of graphics calls are being loop-rolled, it is then determined at block 1124 whether this particular graphics call is the next expected graphics call in the repetitive series currently being loop-rolled.

If the graphics call is the next expected graphics call, a pattern counter that keeps track of the number of times the pattern has appeared is incremented at block 1126. If the call does not belong in the grouping, the value of the pattern counter is used at block 1130 to generate the sequence of repetitive graphics calls. The number of times the pattern is repeated is determined by the value of the pattern counter.

Following either the output of the repetitive graphics calls or the determination that a series of graphics calls is not currently being loop-rolled, it is then determined, at block 1132, whether there are any other predetermined sequences. If there are no other predetermined sequences the graphics call is output at block 1134. If there are other predetermined sequences, the next sequence is selected at block 1136. Whether this graphics call belongs in the just selected sequence is determined at block 1138. If it does not, then at block 1132, it is determined whether another predetermined sequence exists to which the graphics call may be compared. This is repeated until either it is determined that the graphics call belongs in the just selected sequence, at block 1138, or there are no more sequences to compare the graphics call to, which is determined at block 1132. If the graphics call is determined to match a sequence at block 1138, then the just selected sequence becomes the reference sequence and loop rolling is begun at block 1140.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. In a graphics system including a graphics application communicating with graphics hardware through a first driver interfaced with the graphics application and a second driver interfaced with the graphics hardware, and a graphics interface through which the first driver transmits original graphics call sequences to the second driver, a performance optimization apparatus comprising:

at least one graphics call sequence optimizer for processing an original graphics call sequence to produce an optimized graphics call sequence; and measuring means for measuring performance of said optimized graphics call sequence, wherein said graphics application is modified based upon performance improvements achieved in said graphics hardware when provided said optimized graphics call sequence, said modified graphics application producing said optimized graphics call sequence rather than said original graphics call sequence.

2. The apparatus of claim 1, wherein said optimized graphics call sequence is provided to said graphics hardware.

3. The apparatus of claim 1, wherein said at least one graphics call sequence optimizer comprising:

a first graphics call sequence optimizer that receives said original graphics call sequence and generates an intermediate optimized graphics call sequence; and a second graphics call sequence optimizer that receives said intermediate optimized graphics call sequence and generates said optimized graphics call sequence.

4. The apparatus of claim 1, further comprising:

a capture mechanism configured to capture said original graphics call sequence transmitted between said first and second drivers and to provide said captured graphics call sequence to said at least one optimizer.

5. The apparatus of claim 1, wherein said at least one graphics call sequence optimizer comprises:

a graphics state call coalescer constructed and arranged to eliminate from a continuous series of graphics state calls in said original graphics call sequence one or more graphics state calls that do not cause said continuous series of graphics state calls to effect a change in a rendering by said graphics hardware.

6. The apparatus of claim 1, wherein said at least one graphics call sequence optimizer comprises:

a graphics primitive coalescer constructed and arranged to coalesce a continuous series of primitive command sets occurring in said original graphics call sequence, said primitive command sets specifying a same type of discrete primitive and comprising at least one graphics vertex call, said graphics primitive coalescer generating a coalesced primitive command set comprising a plurality of graphics vertex calls causing said graphics hardware to generate a same rendering as said continuous series of primitive command sets.

7. The apparatus of claim 6, wherein said graphics interface is an OpenGL Application Program Interface (API), and wherein each said primitive command set comprises:

a glBegin( )/glEnd( ) graphics call pair, wherein said at least one graphics vertex call is interposed between a glBegin( ) graphics call and a glEnd( ) graphics call of said glBegin( )/glEnd( ) graphics call pair, wherein said graphics primitive coalescer is constructed and arranged to remove all glBegin( ) graphics calls and glEnd( ) graphics calls except a glBegin( ) graphics call occurring first in said continuous series of primitive command sets and a glEnd( ) graphics call occurring last in said continuous series of primitive command sets.

8. The apparatus of claim 6, wherein said plurality of graphics vertex calls in said coalesced primitive command set define a strip primitive and wherein said graphics primitive coalescer is constructed and arranged to remove redundant graphics vertex calls from said coalesced primitive command set that define vertices common to neighboring primitives of said strip primitive and to alter a primitive type specified by said coalesced primitive command set to identify said primitive strip rather than said discrete primitive type.

9. The apparatus of claim 1, wherein said first driver is modified based upon performance improvements achieved in said graphics hardware when provided said optimized graphics call sequence, said modified first driver producing a new graphics call sequence including at least a portion of said optimized graphics call sequence.

10. The apparatus of claim 1, wherein said apparatus is implemented in said second driver to cause said second driver, receiving said original graphics call sequence from said first driver, to generate said optimized graphics call sequence during real-time operations of said graphics system.

11. The apparatus of claim 1, wherein said at least one optimizer is implemented in said graphics hardware to cause said graphics hardware, in response to receiving said original graphics call sequence from said second driver, to generate said optimized graphics call sequence during real-time operations of said graphics system.

12. The apparatus of claim 1, wherein said at least one optimizer is distributed in said second driver and said graphics hardware to generate said optimized graphics call sequence during real-time operations of said graphics system.

13. The apparatus of claim 1, wherein said at least one graphics call sequence optimizer comprises:

a common state primitive compiler constructed and arranged to prevent frequent toggling of graphics state values in said graphics hardware caused by said original graphics call sequence.

14. The apparatus of claim 13, wherein said common state primitive compiler compiles primitive command sets in said original graphics primitive sequence in accordance with common graphics state values in which they are to be rendered, and to generate one or more sequences of said compiled primitive command sets preceded by graphics state calls necessary to establish said common graphics state values.

15. The apparatus of claim 1, wherein said at least one graphics call sequence optimizer comprises:
a primitive type converter constructed and arranged to convert a primitive type specified in a primitive command set in said original graphics call sequence from a non-combinable primitive type including primitives that cannot be coalesced by said graphics primitive coalescer to a combinable primitive type that can be coalesced by said graphics primitive coalescer.

16. The apparatus of claim 1, wherein said at least one graphics call sequence optimizer comprises:
a vertex array builder constructed and arranged to create a vertex array having vertices identified in a series of graphics vertex calls of a primitive command set in said original graphics call sequence, and to generate an associated offset for reference by a graphics array call that uses the array of vertices to render a number of specified primitives.

17. The apparatus of claim 1, wherein said at least one graphics call sequence optimizer comprises:
a vertex loop generator constructed and arranged to generate a repeatable loop to efficiently process repetitive series of graphics calls occurring in a primitive command set in said original graphics call sequence.

18. The apparatus of claim 1, wherein said measuring means comprises:
means for measuring performance of said original graphics call sequence to obtain a performance baseline against which said performance of said optimized graphics call sequence can be compared.

19. The apparatus of claim 1, wherein said measuring means comprises:
means for compiling said original and said optimized graphics call sequences.

20. In a graphics system including a graphics application communicating with graphics hardware through a first driver interfaced with the graphics application and a second driver interfaced with the graphics hardware, and a graphics interface through which the first driver transmits original graphics call sequences to the second driver, a method for optimizing said original graphics call sequence to generate an optimized graphics call sequence causing the graphics hardware to render with improved performance, a same image as said original graphics call sequence, the method comprising:
capturing said original graphics call sequence;
restructuring said original graphics call sequence to produce said optimized graphics call sequence;
measuring a performance of said optimized graphics call sequence; and
modifying said graphics application based upon performance improvements achieved in said graphics hardware when provided said optimized graphics call sequence, said modified graphics application producing said optimized graphics call sequence rather than said original graphics call sequence.

21. The method of claim 20, wherein restructuring said original graphics call sequence comprises:
removing from a continuous series of graphics state calls in said original graphics state sequence all redundant, duplicative and otherwise unnecessary graphics state calls to form a coalesced continuous series of graphics state calls, wherein said coalesced continuous series of graphics state calls includes a number of graphics state calls that is less than a number of graphics state calls in said continuous series of graphics state calls.

22. The method of claim 21, wherein said graphics state calls include multiple first graphics state calls setting values of a first graphics state and wherein the removing operation comprises:
removing all occurrences of said first graphics state calls except a last occurring first graphics state call to form a first reduced graphics state call sequence; and
removing from said first reduced graphics state call sequence all graphics state calls that set a graphics state to a value that said graphics state is currently set at in said graphics hardware.

23. The method of claim 20, wherein restructuring said original graphics call sequence comprises:
coalescing graphics vertex calls contained in a continuous series of primitive command sets that render primitives of the same type in said original graphics call sequence to generate a corresponding coalesced primitive command set in said optimized graphics call sequence effecting a same rendering in said graphics hardware as said original graphics call sequence.

24. The method of claim 23, wherein said graphics interface is an OpenGL graphics API, and wherein coalescing graphics vertex calls comprises:
removing intermediate glBegin( )/glEnd( ) pairs of said primitive command sets to create a single primitive command set comprising all of the graphics vertex calls in the original continuous series of primitive command sets.

25. The method of claim 24, wherein coalescing graphics vertex calls further comprises:
determining whether said graphics primitive calls in said single primitive command set define discrete primitives having sufficient common vertices to be rendered as a primitive strip;
eliminating, when a strip primitive is possible, redundant graphics vertex calls; and
changing, when a strip primitive is possible, the specified primitive type to an equivalent primitive strip primitive type.

26. The method of claim 23, wherein restructuring said original graphics call sequence comprises:
removing from a continuous series of graphics state calls in said original graphics state sequence all redundant, duplicative and otherwise unnecessary graphics state calls to form a coalesced continuous series of graphics state calls, wherein said coalesced continuous series of graphics state calls includes a number of graphics state calls less than a number of graphics state calls in said continuous series of graphics state calls and causing said graphics hardware to render a same image as said continuous series of graphics state calls.

27. The method of claim 26, wherein restructuring said original graphics call sequence comprises:
compiling a continuous series of primitive command sets that are to be rendered with a same state values preceded by graphics state calls necessary to establish common state values in which said primitive command sets are to be rendered.

28. A The method of claim 20, wherein restructuring said original graphics call sequence comprises:
compiling a continuous series of primitive command sets that are to be rendered with a common graphics state values preceded by graphics state calls necessary to establish said common graphics state values in which said primitive command sets are to be rendered.

29. The method of claim 28, wherein said graphics interface is an OpenGL graphics API, and wherein compiling a continuous series of primitive command sets comprises:

compiling said primitive command sets based upon graphics state calls immediately preceding said primitive command sets; and associating only graphics state calls necessary for rendering each said compiled list of primitive command sets with said compiled list of said primitive command sets.

30. The method of claim 28, wherein compiling a continuous series of primitive command sets comprises:

creating a vertex array having vertices identified in a series of graphics vertex calls of a primitive command set; and generating said associated pointer and said graphics array call referencing said pointer.

31. The method of claim 30, wherein creating a vertex array having vertices identified in a series of graphics vertex calls of a primitive command set comprises:

accumulating into an array a plurality of vertices specified in all graphics vertex calls occurring in a primitive command set; and wherein generating said associated pointer and said graphics array call referencing said pointer comprises:

generating a pointer to said array; and generating an appropriate array processing graphics call that accesses the vertex array using said pointer, wherein said array processing graphics call accesses said array, causing a rendering by said graphics hardware of a graphics primitive having its vertices located at the locations stored in the array.

32. The method of claim 30, wherein said graphics interface is an OpenGL API, and wherein said graphics call is glDrawArrays graphics call and said pointer is defined by a glVertexPointer graphics call.

33. The method of claim 28, wherein compiling a continuous series of primitive command sets comprises:

identifying graphics calls that comprise a repetitive series;

counting a number of occurrences each said graphics call continuously appears in the primitive command set; and generating an optimized graphics call sequence effecting a loop execution of said repetitive graphics calls for the identified number of times the particular repetitive pattern should be implemented.

34. The method of claim 20, wherein restructuring said original graphics call sequence comprises:

converting, prior to compiling a continuous series of primitive command sets, said specified primitive type from a primitive type that cannot be coalesced to a primitive type that can be coalesced.

35. The method of claim 34, wherein said graphics API is an OpenGL graphics API, and wherein said graphics primitives comprise line strips, triangle strips, quadrilateral strips, triangle fans, line loops and,polygon primitive types.

36. The method of claim 34, wherein said graphics API is an OpenGL API, and wherein converting said specified primitive type comprises:

converting a primitive type specified in a primitive command set from a line strip to a line when said primitive command set includes 2 graphics vertex calls.

37. The method of claim 34, wherein said graphics interface is an OpenGL API, and wherein converting said specified primitive type comprises:

converting a primitive type specified in a primitive command set from a triangle strip to a triangle when said primitive command set includes 3 graphics vertex calls.

38. The method of claim 34, wherein said graphics interface is an OpenGL API, and wherein converting said specified primitive type comprises:

converting a primitive type specified in a primitive command set from a quadrilateral strip to a quadrilateral when said primitive command set includes 4 graphics vertex calls.

39. The method of claim 34, wherein said graphics interface is an OpenGL API, and wherein converting said specified primitive type comprises:

converting a primitive type specified in a primitive command set from a triangle fan to a triangle when said primitive command set includes 3 graphics vertex calls.

40. The method of claim 34, wherein said graphics interface is an OpenGL API, and wherein converting said specified primitive type comprises:

converting a primitive type specified in a primitive command set from a line loop to a line when said primitive command set includes 2 graphics vertex calls.

41. The method of claim 34, wherein said graphics interface is an OpenGL API, and wherein converting said specified primitive type comprises:

converting a primitive type specified in a primitive command set from a polygon strip to a quadrilateral when said primitive command set includes 4 graphics vertex calls.

42. The method of claim 20, wherein restructuring said original graphics call sequence comprises:

creating a vertex array having vertices identified in a series of graphics vertex calls of a primitive command set for reference by an associated pointer and graphics array call to render one or more of a specified primitive.

43. The method of claim 20, wherein restructuring said captured graphics call sequence comprises:

creating a vertex array having vertices identified in a series of graphics vertex calls of a primitive command set in said original graphics call sequence for reference by an associated graphics array call to render one or more specified primitives.

44. The method of claim 20, wherein measuring a performance of said optimized graphics call sequence comprises:

measuring a performance of said original graphics call sequence to obtain a performance baseline against which said performance of said optimized graphics call sequence can be compared.

45. The method of claim 20, wherein measuring a performance of said optimized graphics call sequence comprises:

compiling said original and said optimized graphics call sequence.

46. In a graphics system including a graphics application communicably coupled with a graphics hardware through a first driver interfaced with the graphics application and a second driver interfaced with the graphics hardware, said drivers communicating with each other through a graphics interface, a performance optimization apparatus comprising:

at least one graphics call sequence optimizer for processing an original graphics call sequence to produce an optimized graphics call sequence; and measuring means for measuring performance of said optimized graphics call sequence, wherein said graphics application is modified based upon performance improvements achieved in said graphics hardware when provided said optimized graphics call sequence, said modified graphics application producing said optimized graphics call sequence rather than said original graphics call sequence.

47. The apparatus of claim 46, comprising:

capture means, operatively coupled to a communications path coupling said first and second drivers, for capturing said original graphics call sequence transmitted between said first and second drivers; and means for providing said captured graphics call sequence to said at least one graphics call sequence optimizer.

48. The apparatus of claim 46, wherein said at least one optimizer comprises:

graphics state call coalescing means for eliminating from a continuous series of graphics state calls in said original graphics call sequence one or more graphics state calls that do not cause said continuous series of graphics state calls to effect a change in a rendering by said graphics hardware.

49. The apparatus of claim 48, wherein said optimizer further comprises:

primitive type converting means for converting a primitive type specified in a primitive command set in said original graphics call sequence from a non-combinable primitive type including primitives that cannot be coalesced by said graphics primitive coalescing means to a combinable primitive type that can be coalesced by said graphics primitive coalescing means.

50. The apparatus of claim 46, wherein said at least one optimizer comprises:

graphics primitive coalescing means for coalescing a continuous series of primitive command sets occurring in said captured graphics state call, said primitive command sets specifying a same type of discrete primitive and comprising graphics vertex call, said graphics primitive coalescer generating a coalesced primitive command set comprising a plurality of graphics vertex calls causing said graphics hardware to generate a same rendering as said continuous series of primitive command sets.

51. The apparatus of claim 50, wherein said graphics interface is an OpenGL Application Program Interface (API), and wherein each said primitive command set comprises:

a glBegin( )/glEnd( ) graphics call pair, wherein said at least one graphics vertex call is interposed between a glBegin( ) graphics call and a glEnd( ) graphics call of said glBegin( )/glEnd( ) graphics call pair, wherein said graphics primitive coalescing means removes all glBegin( ) graphics calls and glEnd( ) graphics calls except a glBegin( ) graphics call occurring first in said continuous series of primitive command sets and a glEnd( ) graphics call occurring last in said continuous series of primitive command sets.

52. The apparatus of claim 50, wherein said plurality of graphics vertex calls in said coalesced primitive command set define a strip primitive and wherein said graphics primitive coalescing means comprises:

means for removing redundant graphics vertex calls from said coalesced primitive command set that define vertices common to neighboring primitives of said strip primitive and to alter a primitive type specified by said coalesced primitive command set to identify said primitive strip rather than said discrete primitive type.

53. The apparatus of claim 46, wherein said optimizer is implemented in said first driver.

54. The apparatus of claim 46, wherein said optimizer is implemented in said second driver.

55. The apparatus of claim 46, wherein said optimizer is implemented in said graphics hardware.

56. The apparatus of claim 46, wherein said optimizer comprises:

state compiling means for compiling primitive command sets in said original graphics primitive sequence in accordance with graphics state values in which they are to be rendered and for generating one or more sequences of said compiled primitive command sets preceded by graphics state calls necessary to establish a common graphics state values.

57. The apparatus of claim 46, wherein said optimizer comprises:

vertex array generating means for creating a vertex array having vertices identified in a series of graphics vertex calls of a primitive command set in said original graphics call sequence, and to generate an associated offset for reference by a graphics array call that uses the array of vertices to render a number of specified primitives.

58. The apparatus of claim 46, wherein said optimizer comprises:

vertex loop generating means for generating a repeatable loop to efficiently process repetitive series of graphics calls occurring in a primitive command set in said original graphics call sequence.

59. The apparatus of claim 46, wherein said measuring means comprises:

means for measuring performance of said original graphics call sequence to obtain a performance baseline against which said performance of said optimized graphics call sequence can be compared.

60. The apparatus of claim 46, wherein said measuring means comprises:

means for compiling said original and said optimized graphics call sequence.

61. A computer program product for use with a computing system having at least one central processing unit (CPU) and an operating system and operatively coupled to a graphics system including a graphics application communicating with graphics hardware through a first driver interfaced directly with the graphics application and a second driver interfaced directly with the graphics hardware, and a graphics interface through which the first driver transmits original graphics call sequences to the second driver, the computer program product comprising a computer usable medium having embodied therein computer readable program code method steps, the method steps comprising:

capturing said original graphics call sequence;

restructuring said original graphics call sequence to produce said optimized graphics call sequence; and measuring a performance of said optimized graphics call sequence; and modifying said graphics application based upon performance improvements achieved in said graphics hardware when provided said optimized graphics call sequence, said modified graphics application producing said optimized graphics call sequence rather than said original graphics call sequence.

62. The computer program product of claim 61, wherein restructuring said original graphics call sequence comprises:

removing from a continuous series of graphics state calls in said original graphics state sequence all redundant, duplicative and otherwise unnecessary graphics state calls to form a coalesced continuous series of graphics state calls, wherein said coalesced continuous series of graphics state calls includes a number of graphics state calls that is less than a number of graphics state calls in said continuous series of graphics state calls.

63. The computer program product of claim 61, wherein restructuring said original graphics call sequence comprises:

coalescing graphics vertex calls contained in a continuous series of primitive command sets that render primitives of the same type in said original graphics call sequence to generate a corresponding coalesced primitive command set in said optimized graphics call sequence effecting a same rendering in said graphics hardware as said original graphics call sequence.

64. The computer program product of claim 61, wherein restructuring said original graphics call sequence comprises:

compiling a continuous series of primitive command sets that are to be rendered with necessary to establish said common graphics state values in which said primitive command sets are to be rendered.

65. The computer program product of claim 61, wherein said restructuring said original graphics call sequence comprises:

creating a vertex array having vertices identified in a series of graphics vertex calls of a primitive command set for reference by an associated pointer and graphics array call to render one or more of a specified primitive.

66. The computer program product of claim 61, wherein measuring a performance of said optimized graphics call sequence comprises:

measuring a performance of said original graphics call sequence to obtain a performance baseline against which said performance of said optimized graphics call sequence can be compared.

67. The computer program product of claim 61, wherein measuring a performance of said optimized graphics call sequence comprises:

compiling said original and said optimized graphics call sequence.

\* \* \* \* \*